(12) United States Patent
Nagano et al.

(10) Patent No.: US 9,855,786 B2
(45) Date of Patent: Jan. 2, 2018

(54) DISPLAY AND LABELED ARTICLE

(75) Inventors: Akira Nagano, Tokyo (JP); Takashi Nishihara, Tokyo (JP); Kazunari Mitsui, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 980 days.

(21) Appl. No.: 13/485,284

(22) Filed: May 31, 2012

(65) Prior Publication Data
US 2012/0236415 A1 Sep. 20, 2012

Related U.S. Application Data
(63) Continuation of application No. PCT/JP2010/069313, filed on Oct. 29, 2010.

(30) Foreign Application Priority Data

Dec. 1, 2009 (JP) .................................. 2009-273406
Feb. 5, 2010 (JP) .................................. 2010-023976
(Continued)

(51) Int. Cl.
*G03H 1/00* (2006.01)
*G02B 27/42* (2006.01)
(Continued)

(52) U.S. Cl.
CPC ........... *B42D 25/324* (2014.10); *B42D 25/21* (2014.10); *B42D 25/328* (2014.10);
(Continued)

(58) Field of Classification Search
CPC ...... G02B 5/1842; B42D 25/21; B42D 25/22; B42D 25/23; B42D 25/30; B42D 25/324;
(Continued)

(56) References Cited

U.S. PATENT DOCUMENTS 5,058,992 A 10/1991 Takahashi
6,271,967 B1 * 8/2001 Stork .................... G06K 19/16
283/85
(Continued)

FOREIGN PATENT DOCUMENTS

CN 101379419 A 3/2009
EP 1855127 11/2007
(Continued)

OTHER PUBLICATIONS

Chinese Office Action dated Mar. 5, 2014 in corresponding Chinese Application No. 201080054547.X.
(Continued)

*Primary Examiner* — Thomas K Pham
*Assistant Examiner* — Nicholas R Pasko

(57) ABSTRACT

A display including one or more first relief structures is provided. Each of the one or more first relief structures includes a smooth first reflection surface and a plurality of protrusions or recesses. Each top surface of the protrusions or each bottom of the recesses is a smooth second reflection surface parallel to the first reflection surface. Each of the one or more first relief structures is configured to display a mixed color as a structural color by mixing a plurality of wavelength components of visible light wavelengths. Also provided is a labeled article that includes the display, and an article supporting the display.

15 Claims, 27 Drawing Sheets

(30) Foreign Application Priority Data

Mar. 29, 2010 (JP) ................................ 2010-074744
Apr. 8, 2010 (JP) ................................ 2010-089381

(51) Int. Cl.
*B42D 25/324* (2014.01)
*G02B 5/18* (2006.01)
*G02B 27/22* (2006.01)
*B44F 1/10* (2006.01)
*B42D 25/351* (2014.01)
*B42D 25/328* (2014.01)
*B42D 25/21* (2014.01)

(52) U.S. Cl.
CPC .............. *B42D 25/351* (2014.10); *B44F 1/10* (2013.01); *G02B 5/1842* (2013.01); *G02B 27/2221* (2013.01)

(58) Field of Classification Search
CPC ................ B42D 25/328; B42D 25/342; B44F 1/00–1/14
USPC .......... 359/2, 3, 15, 436–442, 478–479, 567
See application file for complete search history.

(56) References Cited

U.S. PATENT DOCUMENTS

| | | | | |
|---|---|---|---|---|
| 6,801,346 B2* | 10/2004 | Schilling | .............. | B42D 25/328 283/85 |
| 6,906,861 B2* | 6/2005 | Tompkin | .................. | G02B 5/18 359/567 |
| 7,078,090 B2* | 7/2006 | Tompkin | ................ | B42D 25/41 283/107 |
| 2004/0179266 A1* | 9/2004 | Schilling | ................ | G06K 19/16 359/558 |
| 2007/0020404 A1* | 1/2007 | Seiberle | ................ | B29C 41/003 428/1.2 |
| 2007/0196616 A1* | 8/2007 | Stalder | ................. | G02B 5/0257 428/64.1 |
| 2008/0239216 A1* | 10/2008 | Miyamoto | ............... | G02B 5/10 349/113 |
| 2008/0272883 A1* | 11/2008 | Toda | .................... | G02B 5/1809 340/5.8 |
| 2009/0009868 A1 | 1/2009 | Wu et al. | | |
| 2009/0179418 A1* | 7/2009 | Stalder | ................. | G02B 5/0221 283/85 |
| 2010/0254007 A1* | 10/2010 | Toda | .................... | G02B 5/1842 359/567 |

FOREIGN PATENT DOCUMENTS

| | | | | |
|---|---|---|---|---|
| JP | | 2003-149405 | 5/2003 | |
| JP | | 2008-134586 | 6/2008 | |
| JP | | 2008-275740 | 11/2008 | |
| JP | | 2009-175221 | 8/2009 | |
| JP | WO | 2009128168 A1 * | 10/2009 | .......... G02B 5/0221 |
| JP | | 2010-52437 | 3/2010 | |
| WO | | 2009/040960 | 4/2009 | |

OTHER PUBLICATIONS

International Preliminary Report on Patentability dated Jul. 19, 2012 for corresponding International Application No. PCT/JP2010/069313.

International Search Report for PCT/JP2010/069313 dated Dec. 28, 2010.

Extended European Search Report dated Sep. 26, 2012 in corresponding European Patent Application No. 10834455.7.

Japanese Office Action dated Aug. 3, 2011 in corresponding Japanese Patent Application No. 2010-089381.

Japanese Office Action dated Aug. 16, 2011 in corresponding Japanese Patent Application No. 2010-074744.

Japanese Office Action dated Jan. 4, 2012 in corresponding Japanese Patent Application No. 2010-089381.

Japanese Office Action dated Mar. 27, 2012 in corresponding Japanese Patent Application No. 2010-089381.

Japanese Office Action dated Jan. 28, 2014 in corresponding Japanese Patent Application No. 2010-023976.

Japanese Office Action dated Sep. 30, 2014 in corresponding Japanese Patent Application No. 2010-023976.

Chinese Office Action dated Dec. 30, 2016 in corresponding Chinese Patent Application No. 201510504796.9.

European Office Action dated Sep. 1, 2016 in corresponding European Patent Application No. 10 834 455.7.

* cited by examiner

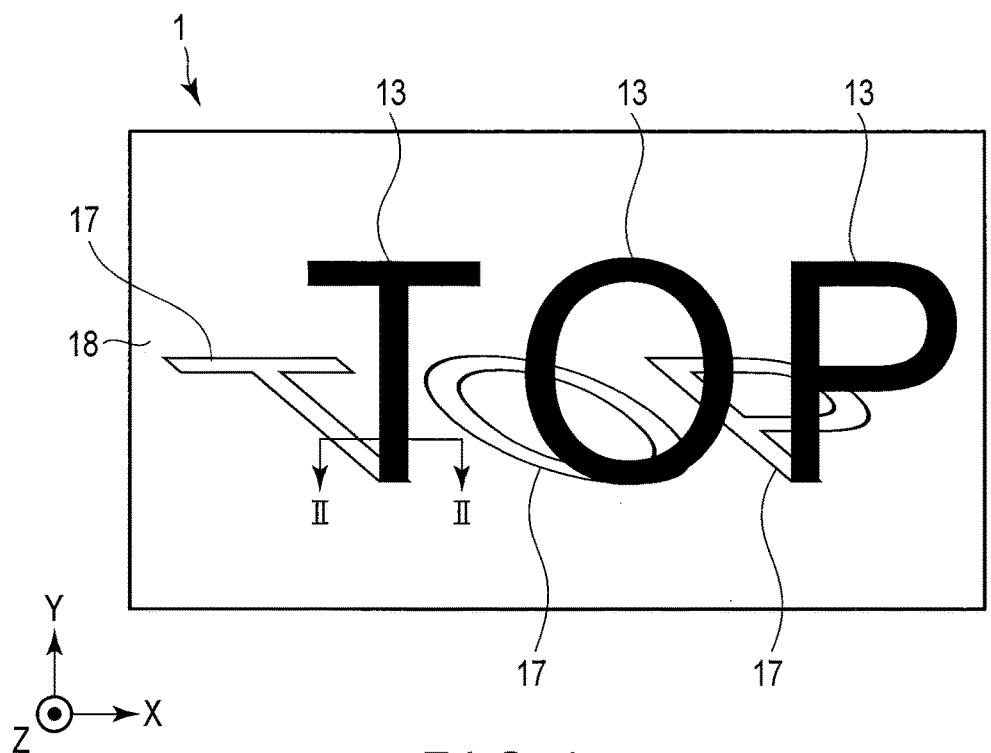
F I G. 1
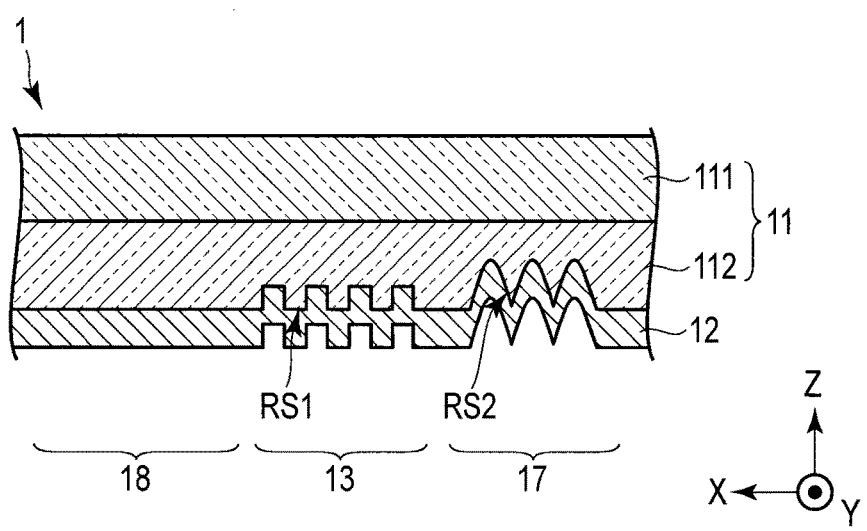
F I G. 2

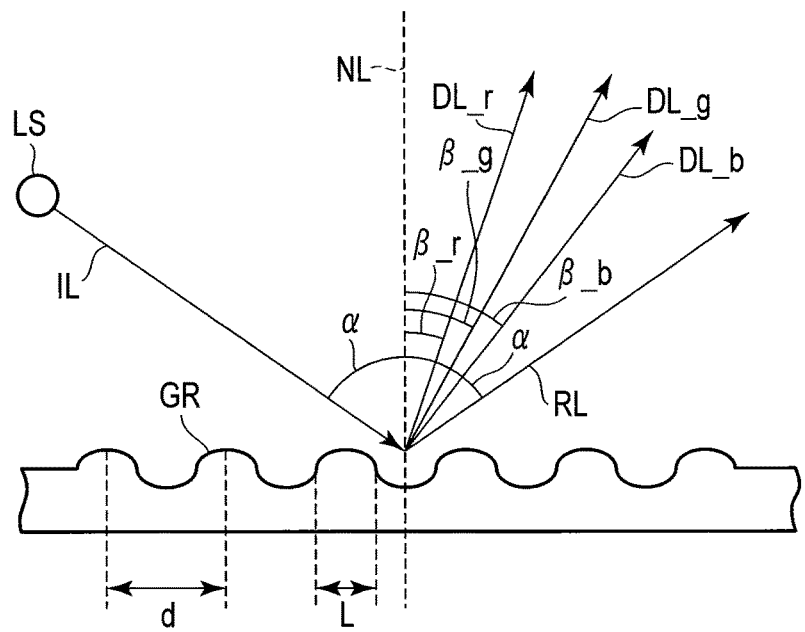
F I G. 3
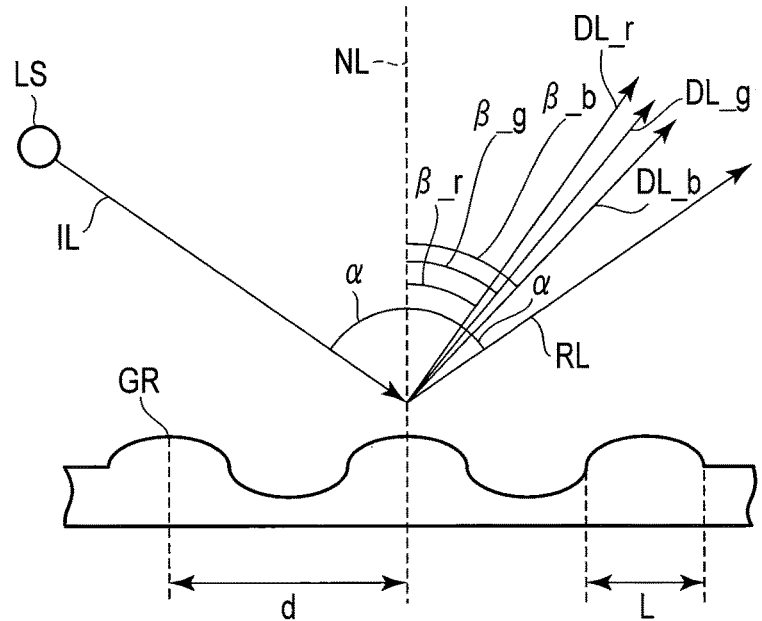
F I G. 4

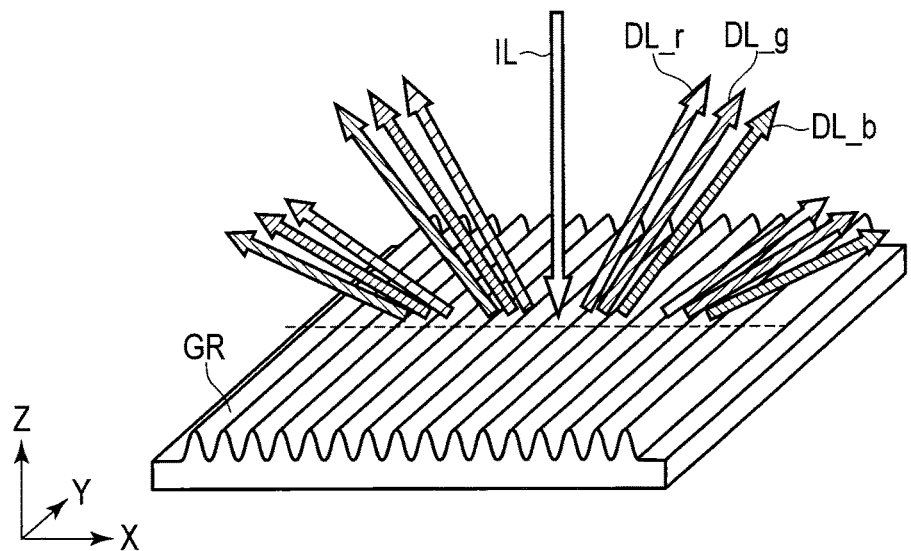
F I G. 12
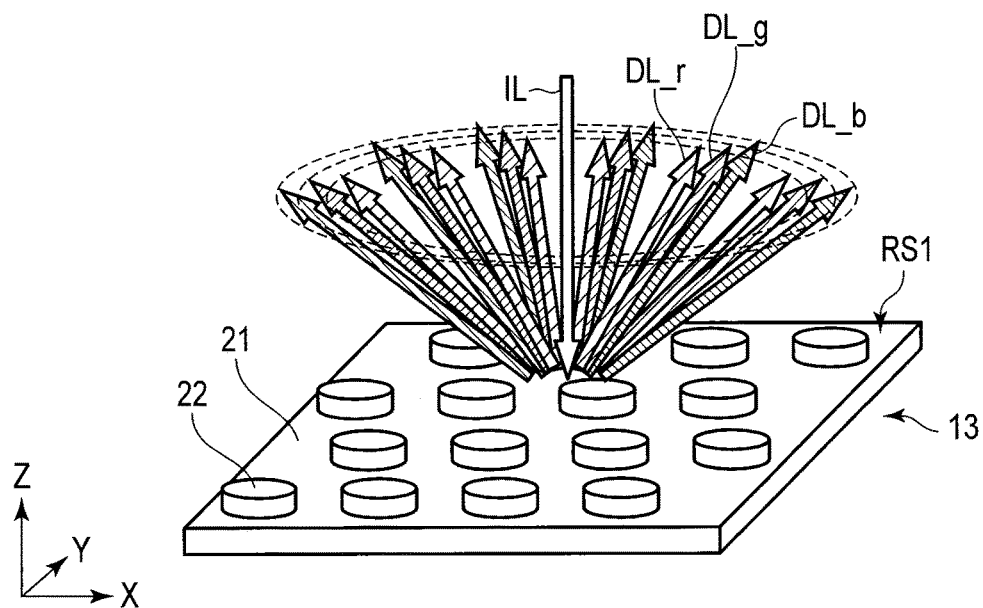
F I G. 13

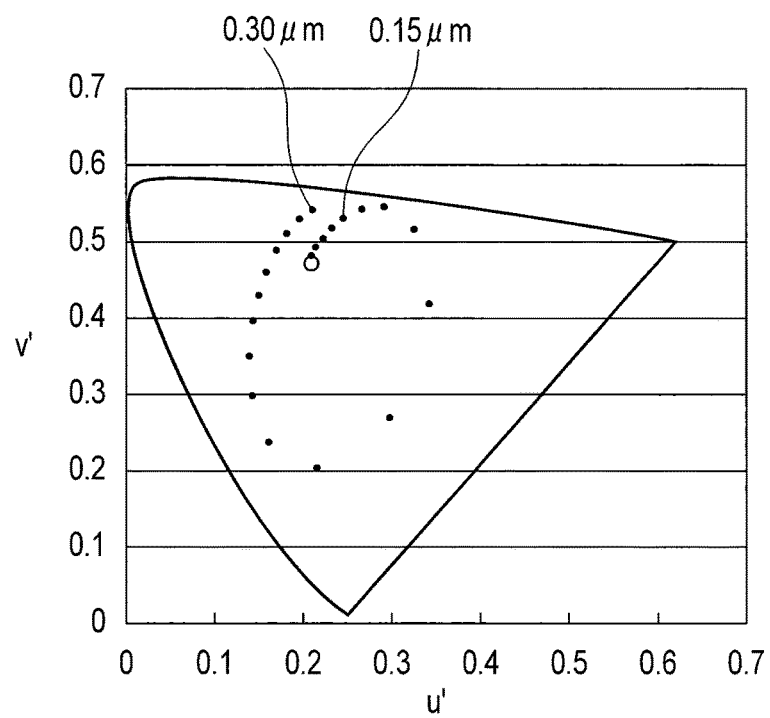
F I G. 17
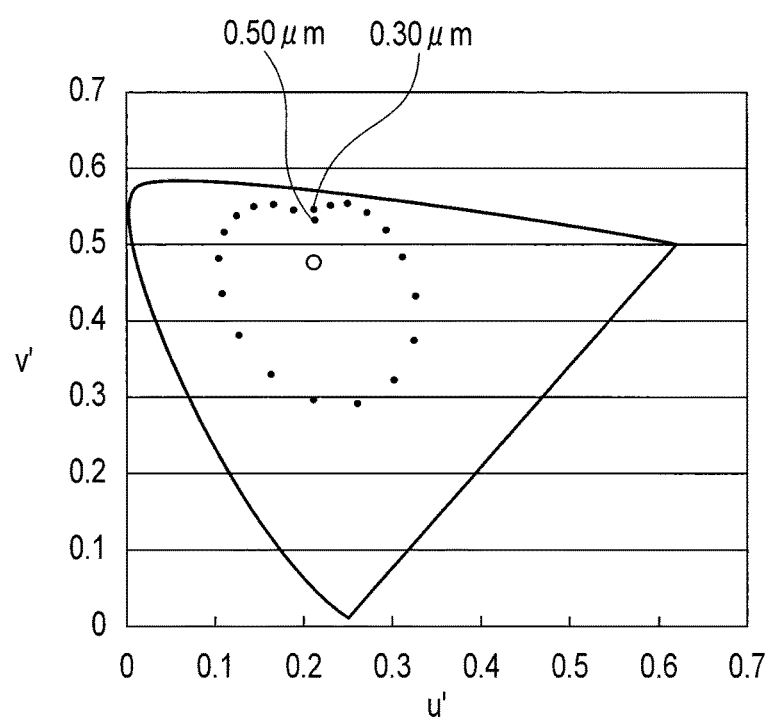
F I G. 18

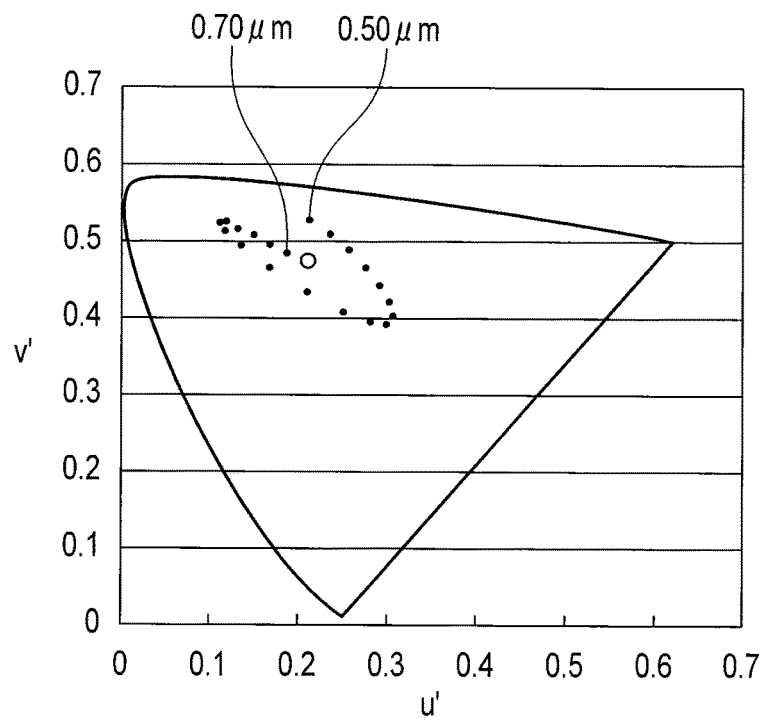
F I G. 19
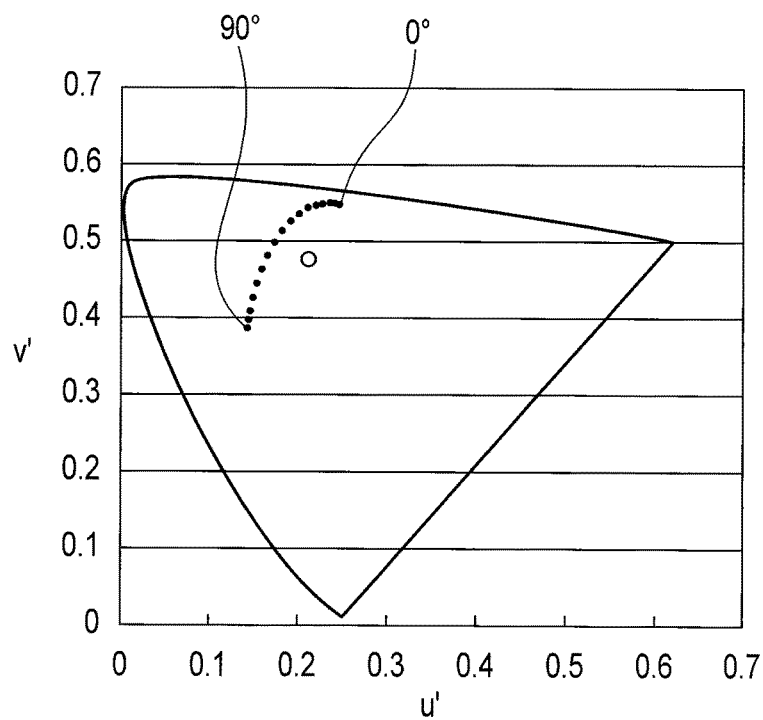
F I G. 20

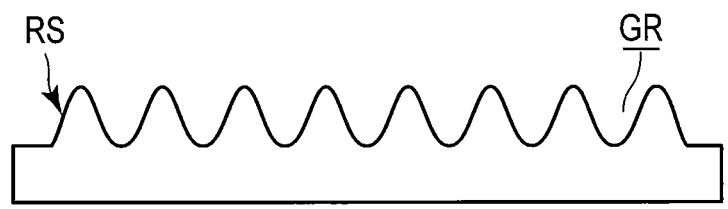
F I G. 22
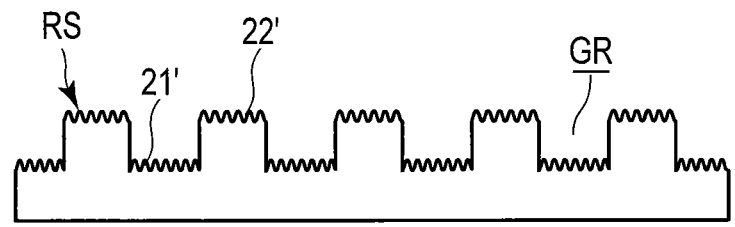
F I G. 23

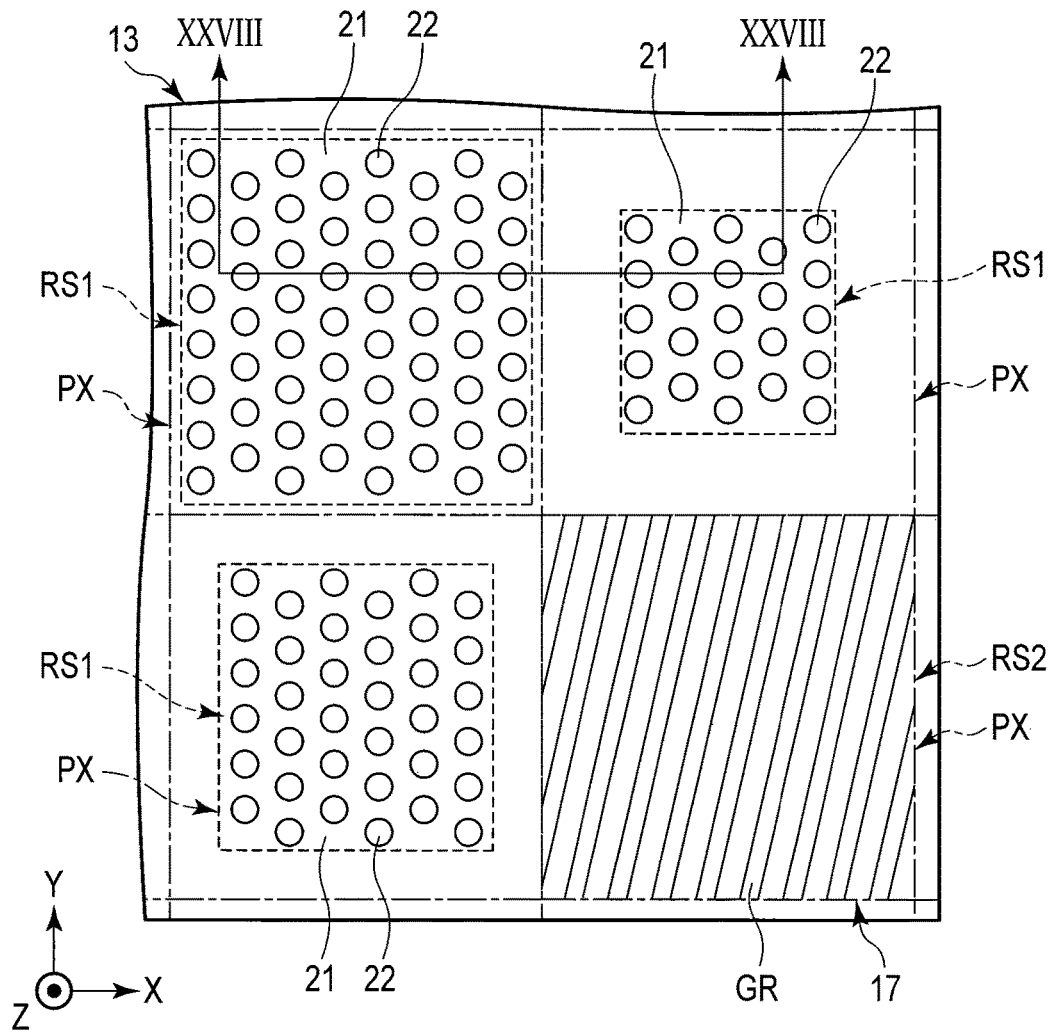
F I G. 26

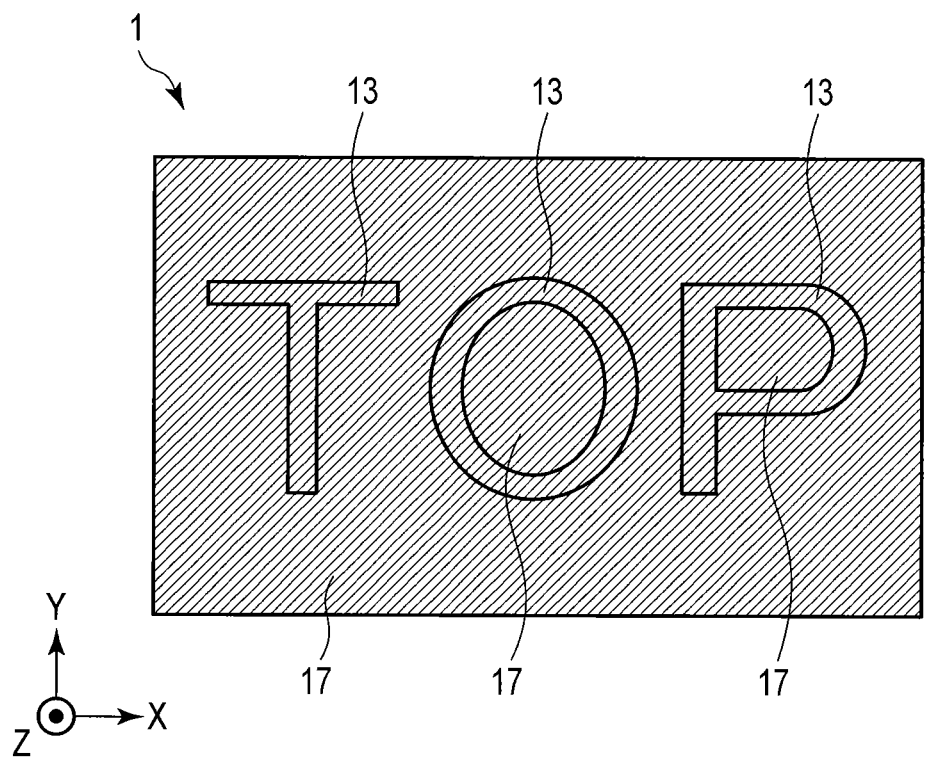
F I G. 35
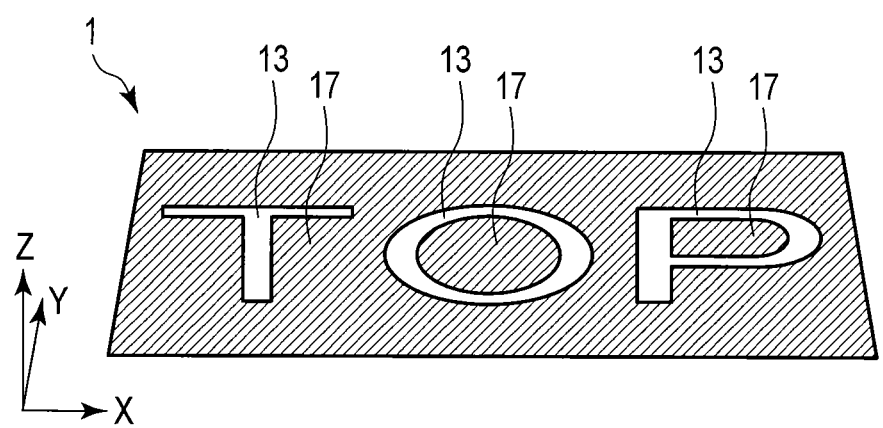
F I G. 36

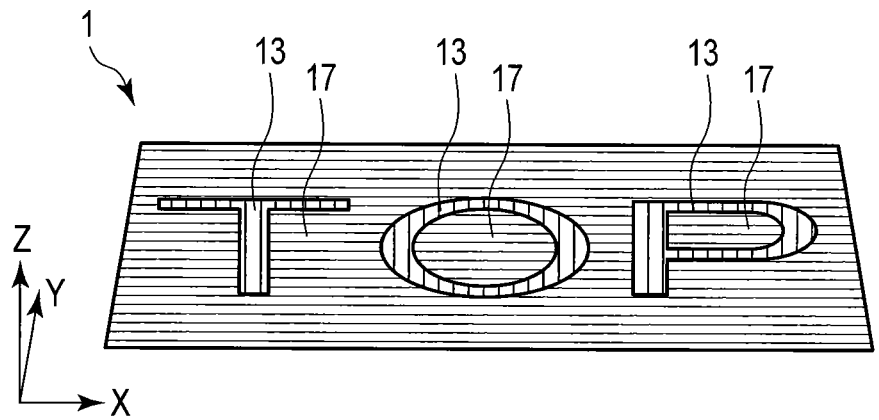
F I G. 41
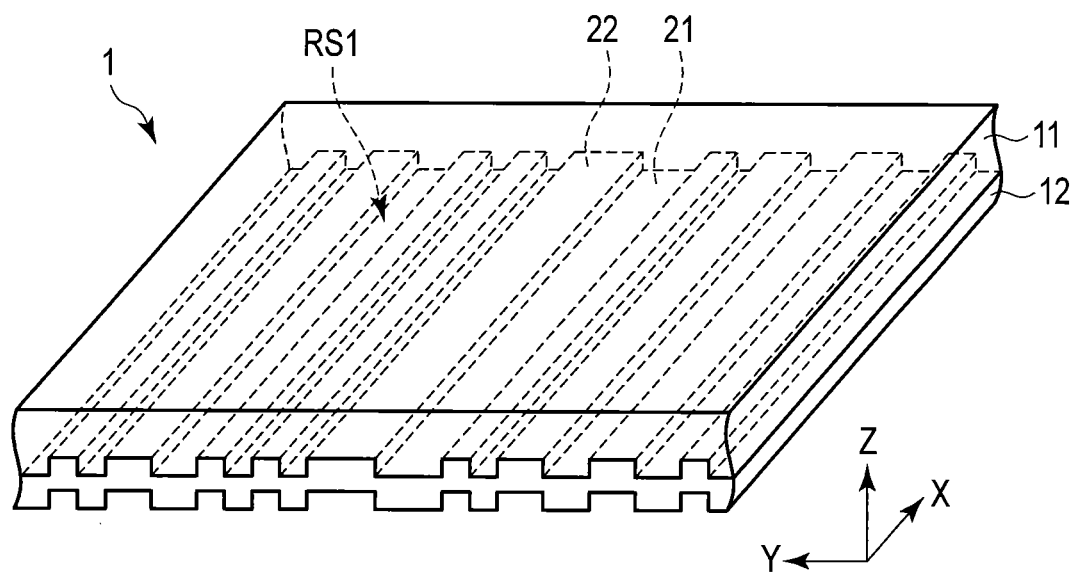
F I G. 42

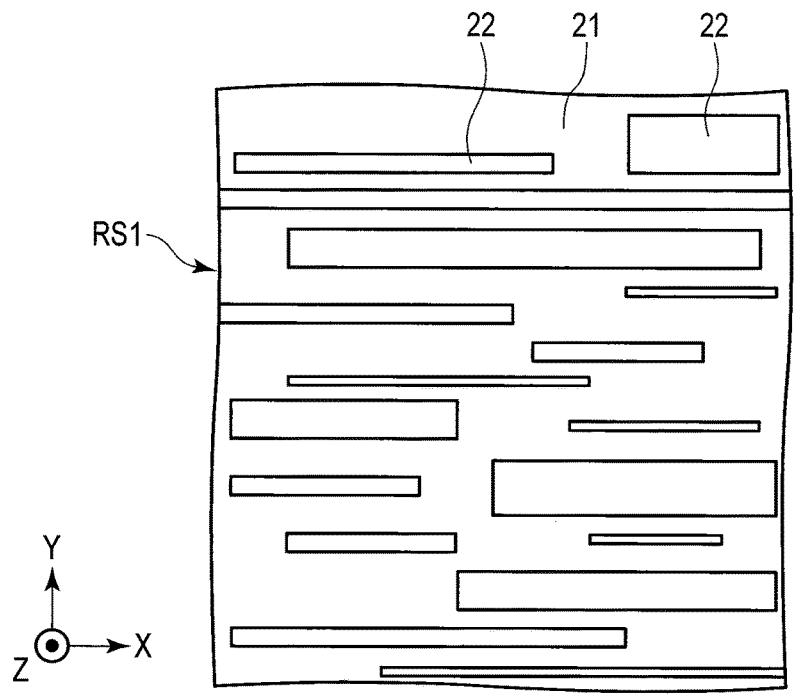
F I G. 43
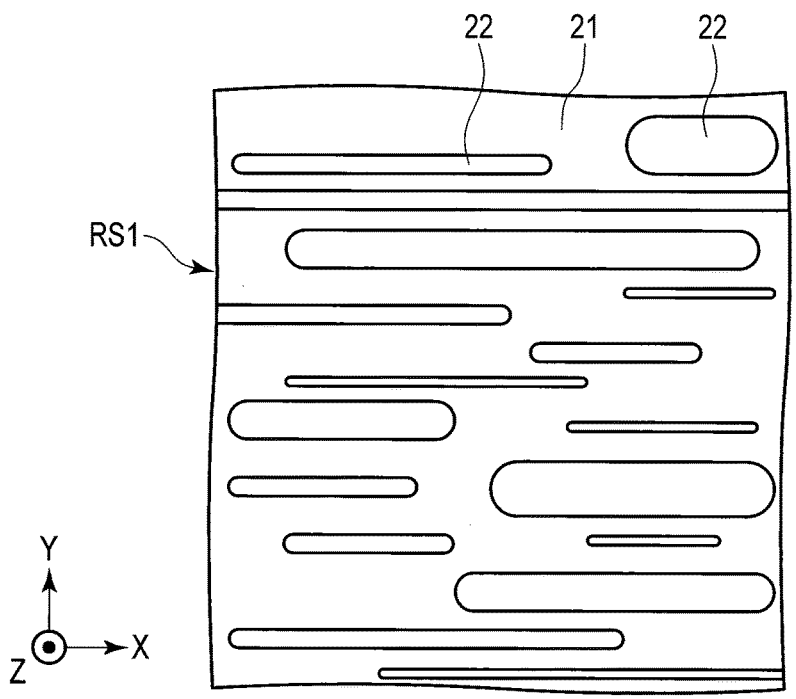
F I G. 44

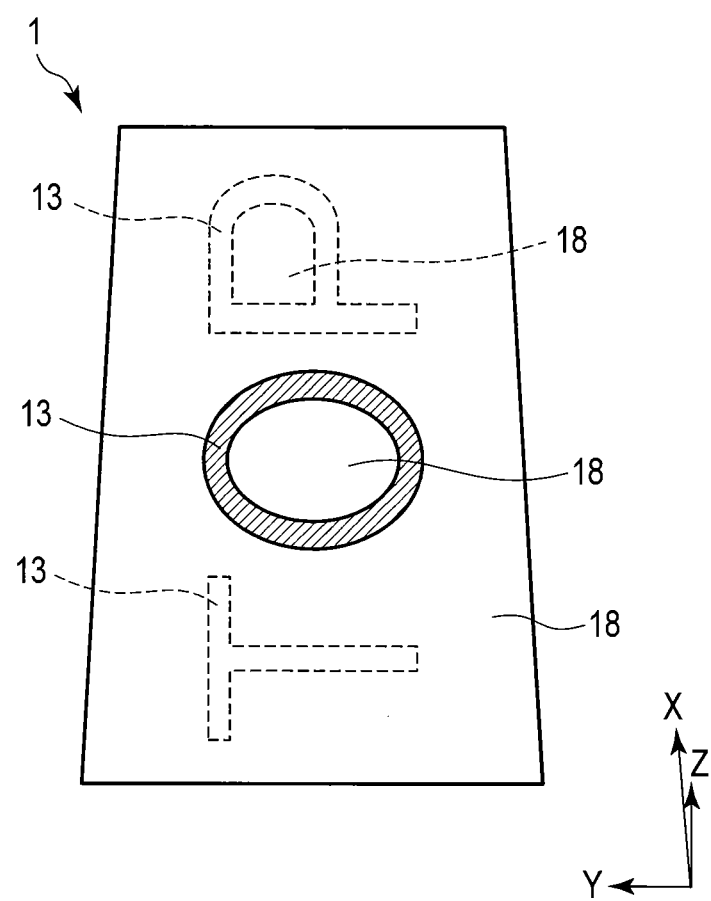
F I G. 47

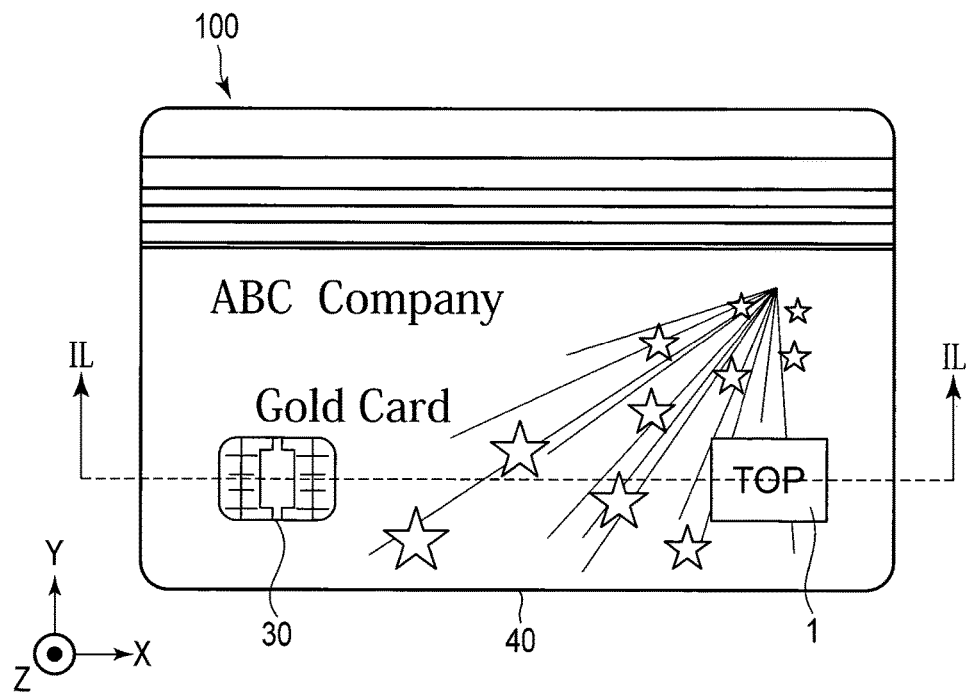
F I G. 48
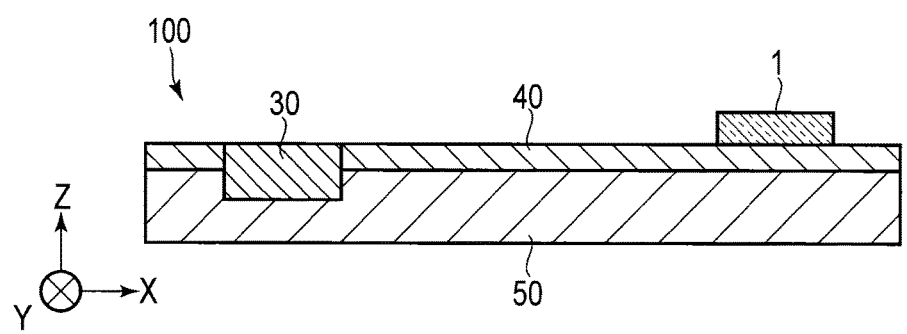
F I G. 49

DISPLAY AND LABELED ARTICLE

CROSS REFERENCE TO RELATED APPLICATIONS

This application is a Continuation Application of PCT Application No. PCT/JP2010/069313, filed Oct. 29, 2010 and based upon and claiming the benefit of priority from prior Japanese Patent Applications No. 2009-273406, filed Dec. 1, 2009; No. 2010-023976, filed Feb. 5, 2010; No. 2010-074744, filed Mar. 29, 2010; and No. 2010-089381, filed Apr. 8, 2010, the entire contents of all of which are incorporated herein by reference.

BACKGROUND OF THE INVENTION

1. Field of the Invention

The present invention relates to a display technique that offers, for example, a forgery-prevention effect.

2. Description of the Related Art

Generally, in order to prevent forgery of securities such as vouchers and checks, cards such as credit cards, cash cards, and ID cards, and certificates such as passports and driver's licenses, theses articles are provided with a display that offers a visual effect different from that offered by a common printed matter. In recent years, for other articles in addition to the above-described articles, distribution of forged articles has become an issue of social concern. Thus, opportunities to apply similar forgery-prevention technique to such articles are increasing.

A display including an arrangement of grooves as a diffraction grating is known as one of displays offering a visual effect different from that offered by a common printed matter. The display can be formed to display, for example, an image that changes in accordance with observation conditions or a stereoscopic image. Iridescent spectral colors displayed by the diffraction grating cannot be created by common printing techniques. Thus, a display including a diffraction grating is widely used for articles requiring forgery-prevention measures.

Jpn. Pat. Appln. KOKAI Publication No. 2-72320 describes arranging diffraction gratings different from each other in the lengthwise directions of the grooves or grating constants, i.e., pitches of grooves, so as to display a pattern. When the position of an observer or light source relative to the diffraction grating changes, the wavelength of diffracted light reaching eyes of the observer changes. Therefore, if the above configuration is adopted, an image changing iridescently can be displayed.

A display using a diffraction grating generally uses a relief-type diffraction grating. A relief-type diffraction grating is normally obtained by duplicating a pattern of a master produced using photolithography.

U.S. Pat. No. 5,058,992 describes a method of manufacturing a master having a relief-type diffraction grating thereon in which a plate-shaped substrate having a photosensitive resist applied thereon is placed on an XY stage, and the photosensitive resist is irradiated with an electron beam while moving the stage under the control of a computer so as to perform pattern exposure on the photosensitive resist. A master having a diffraction grating can also be formed by using two-beam interference.

In the production of a relief-type diffraction grating, first, a master is normally formed by one of methods as described above and then a metallic stamper is produced by, for example, an electroforming technique using the master. Next, the metallic stamper is used as a mother die to duplicate the relief-type diffraction grating. That is, first, a thermoplastic resin or photo-curable resin is applied to a film- or sheet-shaped thin transparent substrate made of, for example, polyethylene terephthalate (PET) or polycarbonate (PC). Next, a metallic stamper is brought into close contact with the coated film and heat or light is applied to the resin layer in this state. After curing the resin, the metallic stamper is removed from the cured resin so as to obtain a duplicate relief-type diffraction grating.

Generally, the relief-type diffraction grating is transparent. Thus, a reflection layer is normally formed on the resin provided with the relief structure by depositing a single layer or a plurality of layers of a metal such as aluminum or a dielectric by using the evaporation method.

Subsequently, the display obtained as described above is pasted on a substrate made of, for example, paper or a plastic film via an adhesive layer or sticky layer. Thus, the display adopting forgery-prevention measures is obtained.

The master used for producing the display including the relief-type diffraction grating is difficult to manufacture. Moreover, a relief structure needs to be transferred from the metallic stamper to the resin layer with high precision. That is, a high level of technique is required to produce a display including a relief-type diffraction grating.

However, as a result of the fact that the display including a relief-type diffraction grating is increasingly used in many articles requiring forgery-prevention measures, the technique is now widely recognized and accordingly, forgeries tend to increase. Thus, it is becoming increasingly more difficult to achieve a sufficient forgery-prevention effect by using a display only featured in that iridescent light is presented by diffracted light.

BRIEF SUMMARY OF THE INVENTION

An object of the present invention is to provide a display offering characteristic visual effects.

According to a first aspect of the present invention, there is provided a display including one or more first relief structures, wherein each of the one or more first relief structures includes a smooth first reflection surface and a plurality of protrusions or recesses, each top surface of the protrusions or each bottom of the recesses is a smooth second reflection surface parallel to the first reflection surface, and each of the one or more first relief structures is configured to display a mixed color as a structural color by mixing a plurality of wavelength components of visible light wavelengths.

According to a second aspect of the present invention, there is provided a labeled article comprising the display according to the first aspect, and an article supporting the display.

BRIEF DESCRIPTION OF THE SEVERAL VIEWS OF THE DRAWING

FIG. 1 is a plan view schematically showing a display according to the first embodiment of the present invention;

FIG. 2 is a sectional view taken along an II-II line of the display shown in FIG. 1;

FIG. 3 is a diagram schematically showing a situation in which a diffraction grating having a small grating constant emits first-order diffracted light;

FIG. 4 is a diagram schematically showing a situation in which a diffraction grating having a large grating constant emits first-order diffracted light;

FIG. 12 is a diagram schematically showing the situation in which a diffraction grating emits diffracted light;

FIG. 13 is a diagram schematically showing the situation in which a first relief structure emits scattered light;

FIG. 17 is a u'v' chromaticity diagram showing an example of color changes caused when the difference between the heights of the first and second reflection surfaces is changed in the range of 0.10 to 0.30 µm;

FIG. 18 is a u'v' chromaticity diagram showing an example of color changes caused when the difference between the heights of the first and second reflection surfaces is changed in the range of 0.30 to 0.50 µm;

FIG. 19 is a u'v' chromaticity diagram showing an example of color changes caused when the difference between the heights of the first and second reflection surfaces is changed in the range of 0.50 to 0.70 µm;

FIG. 20 is a u'v' chromaticity diagram showing an example of color changes caused when the angle of incidence $\theta_0$ of illumination light is continuously changed in the range of 0° to 90°;

FIG. 22 is a sectional view schematically showing an example of the diffraction grating;

FIG. 23 is a sectional view schematically showing another example of the diffraction grating;

FIG. 26 is a plan view schematically showing an example of the structure that can be adopted for a display according to the second embodiment of the present invention;

FIG. 35 is a plan view schematically showing an example of the image displayed by the display according to the third embodiment of the present invention when an observer observes it from the normal direction;

FIG. 36 is a perspective view schematically showing an example of the image displayed by the display shown in FIG. 35 when an observer observes it from an oblique direction;

FIG. 41 is a perspective view schematically showing an example of the image displayed by the display shown in FIGS. 39 and 40 when an observer observes it from the oblique direction;

FIG. 42 is a perspective view schematically showing an example of the structure that can be adopted for a display according to the fourth embodiment of the present invention;

FIG. 43 is a plan view schematically showing an example of a modification of the relief structure shown in FIG. 42;

FIG. 44 is a plan view schematically showing another example of the modification of the relief structure shown in FIG. 42;

FIG. 47 is a perspective view schematically showing another example of the image displayed by the display shown in FIG. 45;

FIG. 48 is a plan view schematically showing an example of a labeled article; and FIG. 49 is a sectional view taken along an IL-IL line of the labeled article shown in FIG. 48.

DETAILED DESCRIPTION OF THE INVENTION

Figure 5:
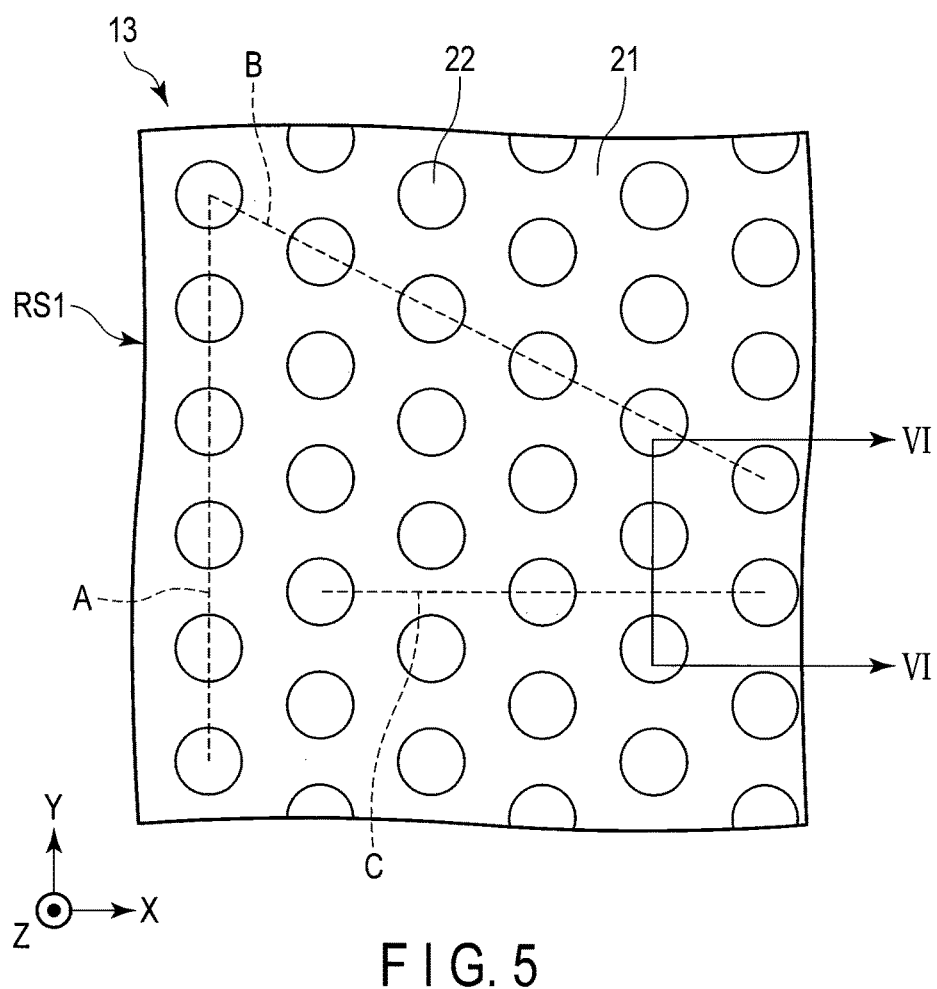
FIG. 5 is a plan view schematically showing an example of a first relief structure that can be adopted for the display shown in FIG. 1.

Embodiments of the present invention will be hereinafter described in detail with reference to drawings. It should be noted that constituent elements achieving the same or similar functions are denoted with the same reference numerals throughout the drawings, and redundant explanation thereof is omitted.

First Embodiment

First, the first embodiment of the present invention will be described.

FIG. 1 is a plan view schematically showing a display according to the first embodiment of the present invention. FIG. 2 is a sectional view taken along an II-II line of the display shown in FIG. 1. In FIGS. 1 and 2, the X direction and the Y direction are directions parallel to a display surface and perpendicular to each other. The Z direction is a direction perpendicular to the X direction and the Y direction.

As shown in FIG. 2, a display 1 includes a layered product of a light-transmitting layer 11 and a reflection layer 12. In this example, the side on the light-transmitting layer 11 is assumed to be a front side, i.e., observer's side and the side on the reflection layer 12 is assumed to be a back side.

The light-transmitting layer 11 includes a substrate 111 and a relief structure formation layer 112.

The substrate 111 has light-transmitting properties. The substrate 111 is typically transparent and particularly transparent and colorless. As the material of the substrate 111, for example, a resin having relatively high heat resistance such as PET and polycarbonate (PC) can be used.

The substrate 111 is a film or sheet that can be handled alone. The substrate 111 plays a role as an underlayer of the relief structure formation layer 112 and also plays a role in protecting the relief structure formation layer 112 from damage. The substrate 111 can be omitted.

The relief structure formation layer 112 is a layer formed on the substrate 111. The relief structure formation layer 112 has light-transmitting properties. The relief structure formation layer 112 is typically transparent and particularly transparent and colorless.

The portion of the surface of the relief structure formation layer 112 that is positioned inside the region 13 shown in FIG. 1 and the portion of the surface of the relief structure formation layer 112 that is positioned inside the region 17 shown in FIG. 1 are provided with a first relief structure RS1 and a second relief structure RS2, which are described later, respectively. The portion of the surface of the relief structure formation layer 112 that is positioned inside the region 18 is flat.

As the material of the relief structure formation layer 112, for example, a thermoplastic resin or photo-curable resin can be used. The relief structure formation layer 112 can be obtained by, for example, applying the thermoplastic resin or photo-curable resin onto the substrate 111 and setting the resin while pressing a stamper against the applied film.

The reflection layer 12 covers a surface of the relief structure formation layer 112 on which the relief structures RS1 and RS2 are provided. As the reflection layer 12, for example, a metal layer made of a metallic material such as aluminum, silver, gold, or an alloy thereof can be used. Alternatively, as the reflection layer 12, a dielectric layer having a refractive index different from that of the relief structure formation layer 112 may be used. In addition, as the reflection layer 12, a layered product of dielectric layers in which adjacent dielectric layers have different refractive indexes, that is, a dielectric multilayer film may also be used. Incidentally, the refractive index of, among dielectric layers contained in the dielectric multilayer film, the dielectric layer in contact with the relief structure formation layer 112 is desirably different from that of the relief structure formation layer 112. The reflection layer 12 can be formed by, for example, the vapor phase deposition method such as vacuum evaporation method and sputtering method.

The reflection layer 12 may cover the entire surface on which the relief structures RS1 and RS2 are provided or a portion thereof. The reflection layer 12 covering only a portion of the relief structure formation layer 112, that is, the patterned reflection layer 12 is obtained by, for example, forming a reflection layer as a continuous film by the vapor phase deposition method and then dissolving a portion thereof with a chemical or the like. Alternatively, the patterned reflection layer 12 is obtained by forming a reflection layer as a continuous film and then peeling off a portion of the reflection layer from a relief structure formation layer by using an adhesive material whose adhesive strength to the reflection layer is stronger than that of the reflection layer to the relief structure formation layer. Alternatively, the patterned reflection layer 12 is obtained by performing vapor phase deposition using a mask or using a lift-off process.

The display 1 may further contain other layers such as an adhesive layer, a resin layer, and a print layer.

The adhesive layer is provided, for example, to cover the reflection layer 12. When the display 1 contains both the light-transmitting layer 11 and the reflection layer 12, normally the shape of the surface of the reflection layer 12 is approximately the same as that of an interface between the light-transmitting layer 11 and the reflection layer 12. When an adhesive layer is provided, the surface of the reflection layer 12 can be prevented from being exposed, making duplication for the purpose of forging the relief structure in the above interface more difficult. When the side on the light-transmitting layer 11 is set as the back side and the side on the reflection layer 12 is set as the front side, an adhesive layer is formed on the light-transmitting layer 11.

The resin layer is, for example, a hard coating for preventing the surface of the display 1 from being scratched in use, an antifouling layer to limit adhesion of dirt, an anti-reflection layer to prevent reflection of light on a substrate surface, or an antistatic layer. The resin layer is provided on the front side of a layered product of the light-transmitting layer 11 and the reflection layer 12. If, for example, the side on the light-transmitting layer 11 is the back side and the side on the reflection layer 12 is the front side, in addition to being able to limit damage to the reflection layer 12 by covering the reflection layer 12 with a resin layer, duplication for the purpose of forging the relief structure on the surface thereof can be made more difficult.

Next, the relief structures RS1, RS2 will be described.

In the display 1 shown in FIGS. 1 and 2, the relief structures RS1 and RS2 are provided on the surface of the reflection layer 12.

The relief structure RS1 is provided on the surface of the relief structure formation layer 112 at a position corresponding to the region 13 shown in FIG. 1. Here, three relief structures RS1 are provided on the surface of the relief structure formation layer 112 and these relief structures RS1 display letters "T", "O", and "P" shown in FIG. 1.

The relief structure RS2 is provided on the surface of the relief structure formation layer 112 at a position corresponding to the region 17 shown in FIG. 1. These relief structures RS2 display shadows of the letters "T", "O", and "P" displayed by the relief structures RS1.

The relief structures RS1 and RS2 have different structures, as will be described below.

(First Relief Structure)

Before describing the first relief structure RS1, a relationship between a grating constant of a diffraction grating, i.e., groove pitch, a wavelength of illumination light, an angle of incidence of illumination light, and an angle of emergence of diffracted light will be described.

When a diffraction grating is irradiated with illumination light by using an illumination light source, the diffraction grating emits strong diffracted light in a specific direction in accordance with the traveling direction and the wavelength of the illumination light, which is incident light.

When light travels in a plane perpendicular to the length direction of the grooves of the diffraction grating, an angle of emergence β of mth-order diffracted light (m=0, ±1, ±2, . . . ) can be calculated from the following equation (1).

$$d = \frac{m\lambda}{\sin\alpha - \sin\beta} \quad (1)$$

In the equation (1), d denotes the grating constant of the diffraction grating, m denotes the diffraction order, and λ denotes the wavelength of incident light and diffracted light. α denotes the 0-order diffraction, that is, the angle of emergence of regular reflection light RL. In other words, the absolute value of α is equal to the angle of incidence of illumination light and in the case of a reflection grating, the direction of incidence of illumination light and the direction of emergence of regular reflection light are symmetrical with respect to a normal NL of an interface where the diffraction grating is provided.

Note that in the case where the diffraction grating is of reflection type, the angle α is 0° or more and less than 90°. Note also that in the case where illumination light is radiated in an oblique direction with respect to the interface having the diffraction grating provided thereon and two ranges of angle separated by a boundary value of the angle in a normal direction, that is, 0° are considered, the angle β is a positive value when the direction of emergence of diffracted light and the direction of emergence of regular reflection light are in the same range of angle and the angle β is a negative value when the direction of emergence of diffracted light and the direction of incidence of illumination light are in the same range of angle.

FIG. 3 is a diagram schematically showing a situation in which a diffraction grating having a small grating constant emits first-order diffracted light. FIG. 4 is a diagram schematically showing a situation in which a diffraction grating having a large grating constant emits first-order diffracted light.

A point light source LS radiates white light including a light component R whose wavelength is in a red region, a light component G whose wavelength is in a green region, and a light component B whose wavelength is in a blue region. The light components G, B and R emitted by the point light source LS are incident on a diffraction grating GR at the angle of incidence α. The diffraction grating GR emits diffracted light DL_g as a portion of the light component G at an angle of emergence β_g, diffracted light DL_b as a portion of the light component B at an angle of emergence β_b, and diffracted light DL_r as a portion of the light component R at an angle of emergence β_r. Though not illustrated, the diffraction grating GR also emits diffracted lights of other orders at angles derived from the equation (1).

Thus, under fixed illumination conditions, the diffraction grating emits diffracted light at different angle in accordance with the wavelength thereof. Accordingly, the diffraction grating emits lights of different wavelengths at different angles under a white light source such as the sun and a fluorescent lamp. Therefore, under such illumination conditions, the display color iridescently changes with changes of the observation angle. With an increasing grating constant, diffracted light is emitted in a direction closer to that of the regular reflection light RL, making differences of the angles of emergence β_g, β_b and β_r smaller.

Next, the relationship between the grating constant of a diffraction grating, the wavelength of illumination light, and intensity or diffraction efficiency of diffracted light in a direction of the angle of emergence of the diffracted light will be described.

According to the equation (1), if illumination light is incident on a diffraction grating of the grating constant d at the angle of incidence α, the diffraction grating emits diffracted light at the angle of emergence β. In this case, the diffraction efficiency of light of the wavelength λ changes in accordance with the grating constant and groove depth and the like of the diffraction grating and can be calculated from the equation (2).

$$\eta = \left(\frac{2}{\pi}\right)^2 \times \sin^2\left(\frac{2\pi}{\lambda} \times \frac{r}{\cos\theta}\right) \times \sin^2\left(\frac{\pi}{d} \times L\right) \quad (2)$$

In the equation, η denotes the diffraction efficiency (value from 0 to 1), r denotes the groove depth of the diffraction grating, L denotes the groove width of the diffraction grating, d denotes the grating constant, θ denotes the angle of incidence of illumination light, and λ denotes the wavelength of illumination light and diffracted light. The equation (2) applies only to a diffraction grating in which the section perpendicular to the direction of groove length has a rectangular wave shape and the groove is relatively shallow.

As is evident from the equation (2), the diffraction efficiency η changes in accordance with the groove depth r, the grating constant d, the angle of incidence θ, and the wavelength λ. In addition, the diffraction efficiency η tends to gradually decrease with an increasing diffraction order m.

Next, the structure and optical properties of the relief structure RS1 will be described.

Figure 6:
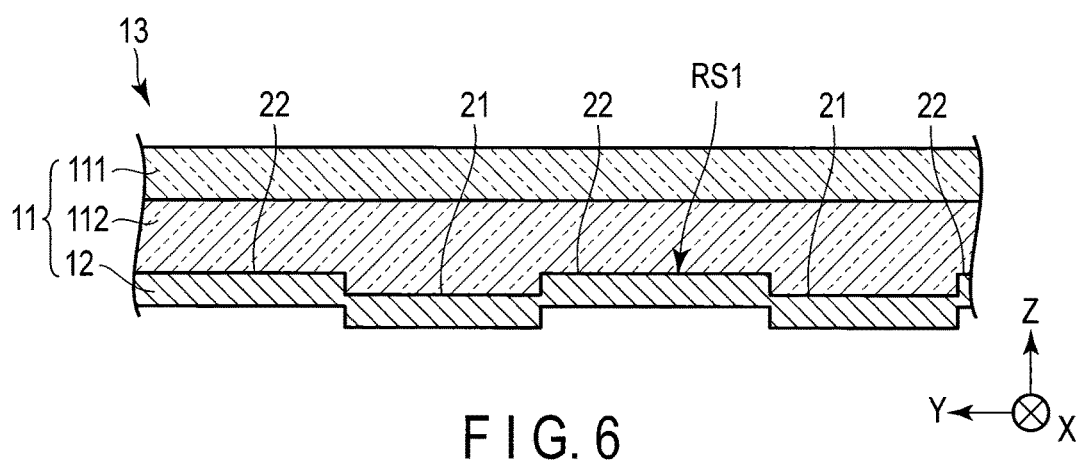
FIG. 6 is a sectional view taken along a VI-VI line of the structure shown in FIG. 5.

FIG. 5 is a plan view schematically showing an example of a first relief structure that can be adopted for the display shown in FIG. 1. FIG. 6 is a sectional view taken along a VI-VI line of the structure shown in FIG. 5.

The relief structure RS1 includes a smooth first reflection surface 21 and a plurality of protrusions each having a top surface and a side surface or a plurality of recesses each having a bottom and a side surface. The top surface of the protrusion or the bottom of the recess is a smooth second reflection surface 22 parallel to the first reflection surface 21. It is assumed here as an example that the second reflection surface 22 constitutes the top surface of a protrusion when viewed from the side on the substrate 111.

The protrusion or recess has a circular shape when viewed from a direction perpendicular to the reflection surface 21. The protrusions or recesses are arranged regularly. In this example, the arrangement of the protrusions or recesses forms a triangular lattice. The arrangement of the protrusions or recesses may also form other lattices, for example, a square lattice or rectangular lattice. When such arrangements are adopted, diffracted light originating from a periodical structure of the diffraction grating can be used for the display.

The reflection surfaces 22 have the same shape and dimensions. The reflection surfaces 22 have a circular shape in this example. The reflection surfaces 22 are arranged regularly corresponding to the protrusions or recesses.

The reflection surface 22 has the length and width in the range of, for example, 2 to 50 μm, 5 to 50 μm, or 0.3 to 10 μm. The reflection surfaces 22 are arranged at average intervals in the range of, for example, 2 to 50 μm, 5 to 50 μm, or 0.3 to 10 μm. When the center-to-center distance of the reflection surfaces 22 is sufficiently long, the angle of emergence of diffracted light can be restricted to a narrow range of angle. That is, diffracted lights of different wavelengths can be made to be incident on eyes of an observer at the same time and therefore, the observer can made to perceive a mixed color. However, if the center-to-center distance of the reflection surfaces 22 is too long, it becomes more difficult to cause the relief structure RS1 to emit diffracted light of sufficient intensity.

The length and width of the reflection surface 22 are measured as shown below. First, among line segments each connecting two points on a contour of the reflection surface 22, the line segment with the maximum length from is determined. The length of the line segment is set as the length of the reflection surface 22. Next, among rectangles and squares having sides parallel to the line segment and circumscribing the contour of the reflection surface 22, a rectangle or a square with the minimum area is selected. The width of the reflection surface 22 is the length of sides of the rectangle and square perpendicular to the line segment.

The height of the reflection surface 22 relative to the reflection surface 21 is, for example, in the range of 0.1 to 0.5 μm and typically, in the range of 0.15 to 0.4 μm. The height of the reflection surface 22 relative to the reflection surface 21 affects diffraction efficiency. When the height is in the above range, a bright display becomes possible. When the height is decreased, the influence of slight changes of external factors during production, for example, the state of manufacturing equipment, variations of the environment, and material composition on optical properties of the relief structure RS1 increases. On the other hand, when the height is increased, it becomes difficult to form the relief structure RS1 with high precision in shape and dimension.

If the above height is set appropriately, when the relief structure RS1 is illuminated with white light from a specific direction, a first reflected light having a wavelength in the visible region and reflected by the reflection surface 21 and a second reflected light having the wavelength and reflected by the reflection surface 22 may cause constructive interference or destructive interference. When the relief structure RS1 is formed with high precision in shape, the relief structure RS1 can be caused to emit colored light as reflected light by using the constructive interference or destructive interference.

In each of the relief structures RS1, all the reflection surfaces 22 contained therein may have a fixed height relative to the reflection surface 21 or have different heights.

Typically, in each of the relief structures RS1, all the reflection surfaces 22 contained therein have a fixed height relative to the reflection surface 21. Such a structure is advantageous to make the diffraction efficiency in some wavelength band lower than that in other wavelength bands.

The side surface of a protrusion (the side wall for a recess) extending from an edge of the reflection surface 21 to an edge of the reflection surface 22 is nearly perpendicular to the reflection surface 21. The side wall (or the side surface) may be inclined to the reflection surface 21.

When the area of an orthogonal projection of the relief structures RS1 on a plane parallel to the reflection surface 21 is S, a ratio S1/S of an area S1 of the reflection surface 21 to the area S is, for example, in the range of 20% to 80% and typically, in the range of 40% to 60%. A ratio S2/S of an area S2 of the reflection surface 22 to the area S is, for example, in the range of 80% to 20% and typically, in the range of 60% to 40%. Also, a ratio (S1+S2)/S of the sum of the area S1 and the area S2 to the area S is, for example, 10% to 100% and typically, in the range of 50% to 100%. When the ratios S1/S and S2/S are 50% each, the brightest display becomes possible. According to an example, the brightness that can be achieved when one of the ratios S1/S and S2/S is 20% and the other is 80% is about 30% of the brightness that can be achieved when the ratios S1/S and S2/S are 50% each.

FIGS. 7 to 11 are plan views schematically showing other examples of the first relief structure that can be adopted for the display shown in FIG. 1.

The relief structures RS1 shown in FIGS. 7 to 11 are similar to the relief structure RS1 shown in FIGS. 5 and 6 excluding the following points.

Figure 7:
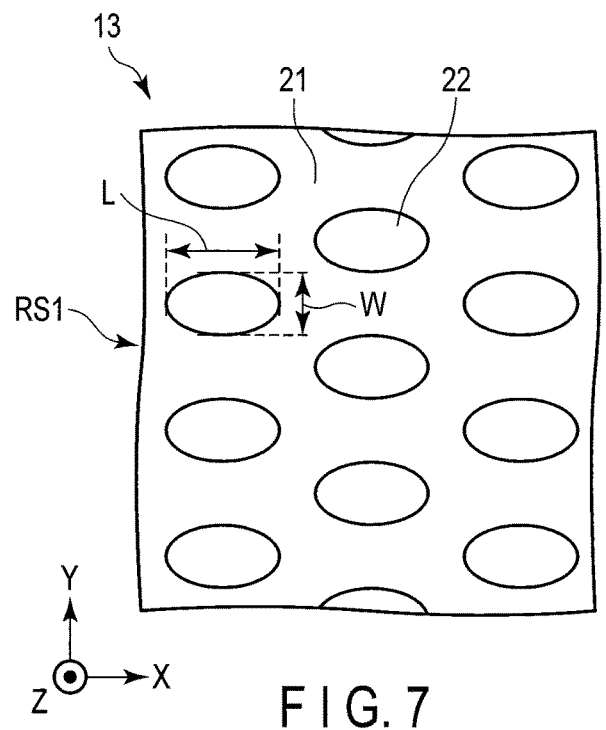
FIG. 7 is a plan view schematically showing another example of the first relief structure that can be adopted for the display shown in FIG. 1.
Figure 8:
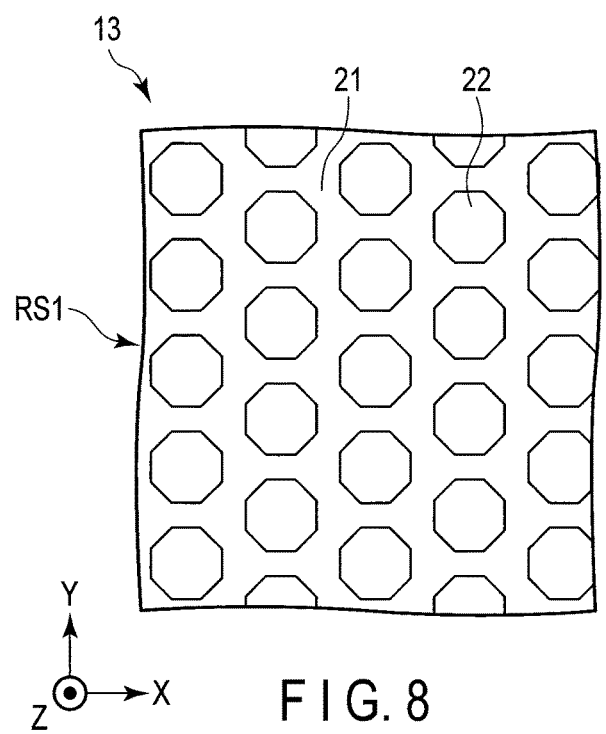
FIG. 8 is a plan view schematically showing another example of the first relief structure that can be adopted for the display shown in FIG. 1.
Figure 9:
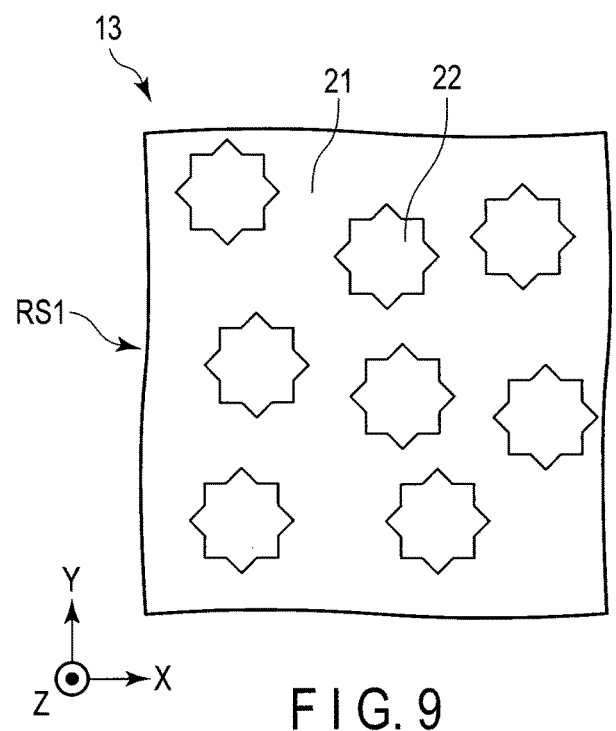
FIG. 9 is a plan view schematically showing another example of the first relief structure that can be adopted for the display shown in FIG. 1.
Figure 10:
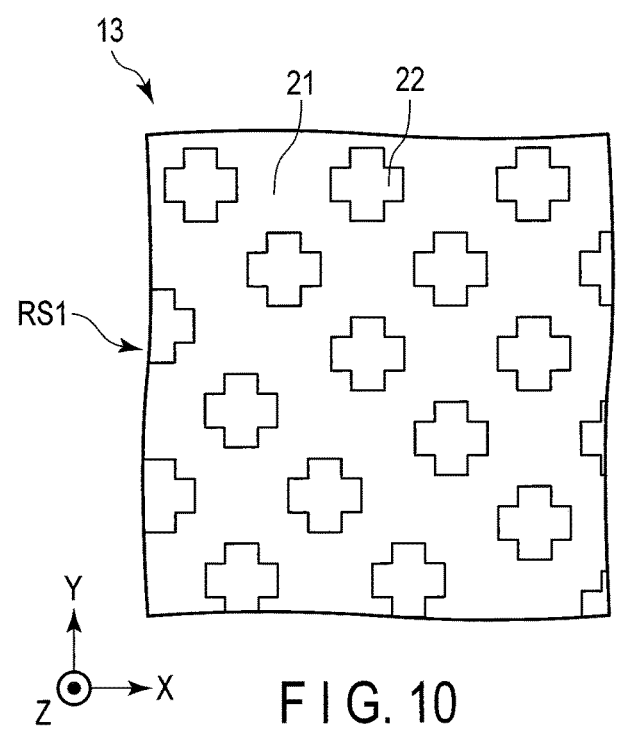
FIG. 10 is a plan view schematically showing another example of the first relief structure that can be adopted for the display shown in FIG. 1.
Figure 11:
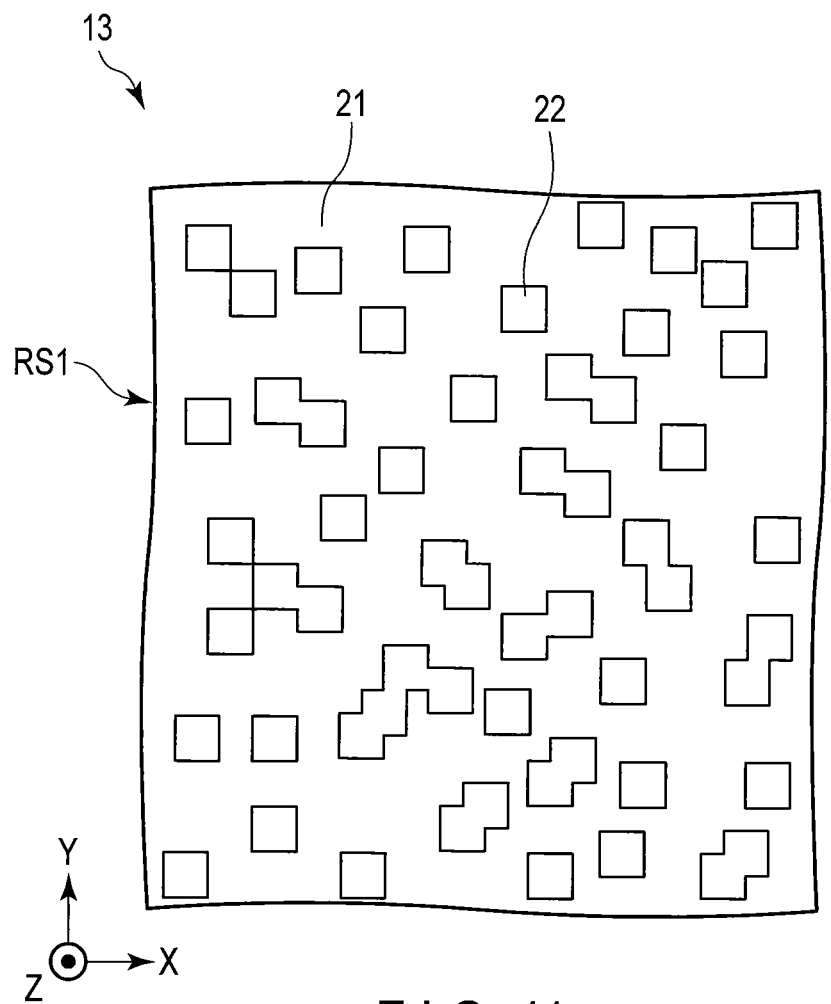
FIG. 11 is a plan view schematically showing another example of the first relief structure that can be adopted for the display shown in FIG. 1.

That is, the reflection surface 22 has an elliptic shape in the relief structure RS1 shown in FIG. 7. The reflection surface 22 has an octagonal shape in the relief structure RS1 shown in FIG. 8. The reflection surface 22 has a star shape and is arranged irregularly in the relief structure RS1 shown in FIG. 9. The reflection surface 22 has a cross shape and is arranged irregularly in the relief structure RS1 shown in FIG. 10. The reflection surface 22 has a square shape and is arranged irregularly in the relief structure RS1 shown in FIG. 11. In FIG. 11, some of the adjacent reflection surfaces 22 are in contact with each other. In FIG. 7, L and W denote the length and width of the reflection surface 22, respectively. As above, the reflection surface 22 can have various shapes. As will be described later, the reflection surface 22 may be arranged regularly or irregularly. When the reflection surface 22 is arranged irregularly, the adjacent reflection surfaces 22 may be in contact with each other.

FIG. 12 is a diagram schematically showing the situation in which a diffraction grating emits diffracted light. FIG. 13 is a diagram schematically showing the situation in which a first relief structure emits scattered light.

The diffraction grating in FIG. 12 is composed of a plurality of grooves GR having the length direction parallel to the Y direction and arranged in the X direction with a fixed pitch. When illumination light IL is incident on the relief structure RS1 in a direction perpendicular to the Y direction, for example, the Z direction, the diffraction grating emits diffracted lights DL_r, DL_g and DL_b in a direction perpendicular to the Y direction. Each angle of emergence of the diffracted lights DL_r, DL_g and DL_b is calculated from the equation (1).

In the relief structure RS1 shown in FIG. 13, the reflection surfaces 22 are arranged two-dimensionally. Thus, when the illumination light IL is incident on the relief structure RS1 from, for example, the Z direction, the relief structure RS1 emits the diffracted lights DL_r, DL_g and DL_b in various directions.

For diffracted light whose angle of emergence is approximately equal to an angle of regular reflection of incident light, if the center-to-center distance of the reflection surfaces 22 (in this case, the grating constant of the diffraction grating) is large, differences between the angles of emergence in accordance with the diffraction order are small. In this case, differences between the angles of emergence in accordance with the wavelength are also small. If, for example, the reflection surfaces 22 have the length and width in the range of 2 to 50 μm and are arranged at intervals in the range of 2 to 50 μm, the relief structure RS1 emits diffracted light in the range of angle of about ±19° with respect to the traveling direction of regular reflection light. When the reflection surfaces 22 have the length and width in the range of 5 to 50 μm and are arrayed at intervals in the range of 5 to 50 μm, the relief structure RS1 emits diffracted light in the range of angle of about ±8° with respect to the traveling direction of regular reflection light. Normally, a general light source such as the sun and a room lamp is not an ideal point light source. In addition, illumination light incident on a display include light reflected or scattered by particles in the air, the ground, floors, and walls. Thus, if the display is observed in very close range from a direction in which regular reflection light can be observed, diffracted lights of various orders and wavelengths are incident on eyes of the observer at the same time.

Therefore, the observer perceives a mixed color. If, for example, red light of the wavelength 630 nm and green light of the wavelength 540 nm are incident on eyes of the observer, the observer perceives yellow. When green light of the wavelength 540 nm and blue light of the wavelength 460 nm are incident on eyes of the observer, the observer perceives cyan, that is, light blue. More concrete examples will be described below.

In a first example, it is assumed for the relief structure RS1 described with reference FIG. 5 that the diameter of the reflection surface 22 is about 10 μm, the ratios S1/S and S2/S are about 50% each, the height of the reflection surface 22 relative to the reflection surface 21 is 0.2 μm. When the relief structure RS1 is observed from a direction perpendicular to a broken line A or B, the relief structure RS1 can be considered as a diffraction grating of the grating constant of about 14 μm.

In this case, when the relief structure RS1 is illuminated with white light from a direction perpendicular to the reflection surface 21, the relief structure RS1 emits, for example, light of the wavelength of 630 nm at an angle of emergence of about 2.58°, light of the wavelength of 540 nm at an angle of emergence of about 2.21°, and light of the wavelength of 460 nm at an angle of emergence of about 1.88° in a direction perpendicular to the broken line A or B as +1st-order diffracted light. Then, in this case, the relief structure RS1 emits light of the wavelength of 630 nm at an angle of emergence of about 5.16°, light of the wavelength of 540 nm at an angle of emergence of about 4.42°, and light of the wavelength of 460 nm at an angle of emergence of about 3.77° in a direction perpendicular to the broken line A or B as +2nd-order diffracted light. That is, the relief structure RS1 emits diffracted lights of different wavelengths and diffraction orders in a very small range of angle.

When the relief structure RS1 is observed from a direction perpendicular to, for example, a broken line C, the relief structure RS1 can be considered as a diffraction grating of the grating constant a little smaller than 14 μm. Thus, if the relief structure RS1 is illuminated with white light from a direction perpendicular to the reflection surface 21, the relief structure RS1 emits +1st-order diffracted light and +2nd-order diffracted light at small angels of emergence in a direction perpendicular to the broken line C. Therefore, in this case, the relief structure RS1 emits diffracted lights of different wavelengths and diffraction orders in a very small range of angle.

In a second example, it is assumed for the relief structure RS1 described with reference FIG. 5 that the diameter of the reflection surface 22 is about 1 μm and the ratios S1/S and S2/S are about 50% each. When the relief structure RS1 is observed from a direction perpendicular to the broken line A or B, the relief structure RS1 can be considered as a diffraction grating of the grating constant of about 1.4 μm.

In this case, when the relief structure RS1 is illuminated with white light from a direction perpendicular to the reflection surface 21, the relief structure RS1 emits, for example, light of the wavelength of 630 nm at an angle of emergence of about 26.7°, light of the wavelength of 540 nm at an angle of emergence of about 22.7°, and light of the wavelength of 460 nm at an angle of emergence of about 19.2° in a direction perpendicular to the broken line A or B as +1st-order diffracted light. Under normal illumination conditions, as described above, a light source is not an ideal point light source. Thus, if the relief structure RS1 is illuminated with white light from a direction perpendicular to the reflection surface 21, the white light is incident on the relief structure RS1 not only from a normal direction, but also from an oblique direction. When white light is incident on the relief structure at an angle of incidence of 1.0° from a direction perpendicular to the broken line C, the relief structure RS1 emits, for example, light of the wavelength of 630 nm at an angle of emergence of about 25.7°, light of the wavelength of 540 nm at an angle of emergence of about 21.6°, and light of the wavelength of 460 nm at an angle of emergence of about 18.2° in a direction perpendicular to the broken line C as +1st-order diffracted light. That is, the relief structure RS1 emits diffracted lights of different wavelengths in a very small range of angle.

As described above, the relief structure RS1 emits diffracted lights of different wavelengths in a very small range of angle. Therefore, the observer perceives a mixed color.

The mixed color perceived by the observer depends further on the height of the reflection surface 22 relative to the reflection surface 21. This will be described below.

In a diffraction grating, the groove width L and the grating constant d are constant. Therefore, as is evident from the equation (2), the diffraction efficiency η of the diffraction grating can be said to be a function of the groove depth r (or the protrusion height) and the wavelength λ of illumination light. Based on the above, when considering the case of observing the diffraction grating while illuminating the diffraction grating with white light, the fact can be understood that the diffraction efficiency of some wavelength band is lower than that of other wavelength bands and these wavelength bands depend on the groove depth r. Thus, the color perceived by an observer when a diffraction grating is illuminated with white light is affected not only by the angle of incidence θ and the grating constant d of illumination light and the observation direction, but also by the groove depth r. Therefore, the color perceived by the observer when the relief structure RS1 is illuminated with white light is affected by the height of the reflection surface 22 relative to the reflection surface 21.

Different from a general diffraction grating, the relief structure RS1 changes its display color not so much when the observation direction is changed slightly. This will be described below.

As has been described with reference to FIG. 13, when the observer perceives a mixed color, diffracted lights having the same wavelength and different diffraction orders are incident on eyes of the observer at the same time. In addition, when the observer perceives a mixed color, diffracted lights having the same wavelength and derived from lights having different angles of incidence on the relief structure RS1 are incident on eyes of the observer at the same time. When the observation direction is changed only slightly, some diffracted light is no longer incident on eyes of the observer, but other diffracted lights having the same wavelength are incident on eyes of the observer. Therefore, different from a general diffraction grating, the relief structure RS1 changes its display color not so much when the observation direction is changed slightly. Note that when the ratio of the length to the width of the reflection surface 22 is brought closer to 1, the change in color in accordance with the observation angle decreases.

As described above, the relief structure RS1 displays a mixed color as a structural color. When the observation direction is changed slightly from the normal direction, the color displayed by the relief structure RS1 hardly changes. When the observation direction is changed considerably from the normal direction, the relief structure RS1 no longer emits diffracted light. Such a visual effect cannot be achieved by general printed matter, nor can be achieved by a diffraction grating or hologram, nor can be achieved by a combination of a light-scattering structure and a pigmented layer. That is, the relief structure RS1 offers an extremely special visual effect.

In each of the relief structures RS1 described with reference to FIGS. 5 to 10, the reflection surface 22 has the same shape. Such a relief structure is easy to produce.

That is, a master used for the formation of the relief structure RS1 is produced by a method including a step of writing on a resin layer using a charged particle beam and a step of subjecting the resin layer to development. According to the method, the depth of recesses or the height of protrusions is controlled by adjusting the intensity of the charged particle beam or the irradiation time. When the reflection surfaces 22 have different shapes, it is difficult to obtain a relief structure in which the depth of recesses or the height of protrusions is uniform even if the intensity of the charged particle beam or the irradiation time is adjusted. In the case where the reflection surfaces 22 have the same shape, as compared with the case where the reflection surfaces 22 have different shapes, it is easy to obtain a relief structure in which the depth of recesses or the height of protrusions is uniform.

When the reflection surfaces 22 have the same shape, it is easy to design the relief structure RS1. That is, the accurate optical design and optical simulations can be done so that a high-quality master can be produced with high reproducibility. Therefore, a difference in optical performance between the design and a real thing thereof can be minimized so that stray light can be minimized.

The reflection surfaces 22 may be different in at least one of the shape, dimensions, and center-to-center distance.

Figure 14:
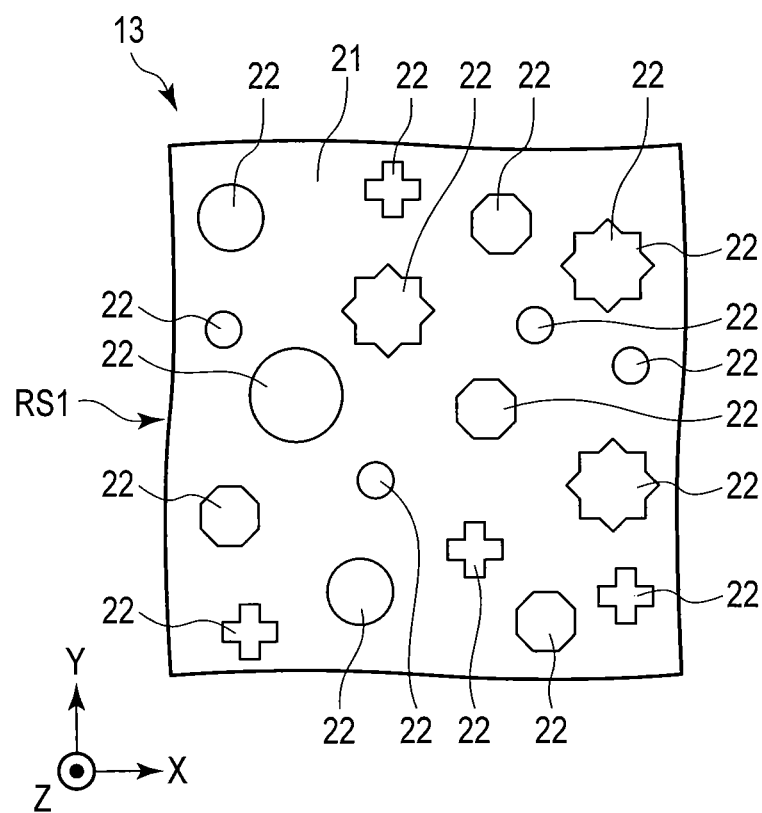
FIG. 14 is a plan view schematically showing still another example of the first relief structure that can be adopted for the display shown in FIG. 1.

FIG. 14 is a plan view schematically showing still another example of the first relief structure that can be adopted for the display shown in FIG. 1.

The relief structure RS1 shown in FIG. 14 includes the reflection surface 22 having a circular shape, the reflection surface 22 having a smaller circular shape, the reflection surface 22 having an octagonal shape, the reflection surface 22 having a star shape, and the reflection surface 22 having a cross shape. These reflection surfaces 22 are arranged irregularly.

Such a relief structure RS1 can be considered to be formed by arranging many tiny diffraction gratings having different grating constants. Therefore, the relief structure RS1 emits diffracted lights of various wavelengths in the same direction. Therefore, the relief structure RS1 provides a visual effect almost the same as that described with reference to FIG. 13. The reason why the relief structure RS1 in which the reflection surfaces 22 are arranged irregularly provides the above visual effect will be described in more detail later.

Moreover, such a structure has the following advantages.

When the reflection surfaces 22 are different in shape, dimension, or center-to-center distance, a true-false judgment using the arrangement of the reflection surfaces 22 can be made. When, for example, the reflection surfaces 22 having different shapes are arranged alternately, if such a structure is verified by an observation through an optical microscope for some display, the display can be judged to be an authentic article. Thus, a person who attempts to produce a forgery needs not only to realize a visual effect similar to that of an authentic article when observed with the naked eye, but also to produce the reflection surfaces 22 in the same shape as that of an authentic article. Therefore, such a structure is effective in curbing the production of forgeries. Moreover, it is relatively difficult to produce such a structure and consequently, it is difficult to forge the display 1 including such a structure. Therefore, if the above configuration is adopted, the effect of preventing forgeries of the display 1 is increased.

When the reflection surfaces 22 are arranged regularly, the length and width of the reflection surface 22 or the center-to-center distance of the reflection surfaces 22 is preferably in the range of 5 to 10 µm. In this way, the relief structure RS1 can be caused to emit diffracted lights of various wavelengths in a narrow angular range. Therefore, the display color of the relief structure RS1 can be prevented from appearing iridescently.

On the other hand, if the reflection surfaces 22 are arranged irregularly, the length and width of the reflection surface 22 or the center-to-center distance of the reflection surfaces 22 is preferably in the range of 0.3 to 5 µm. As described above, the relief structure RS1 in which the reflection surfaces 22 are arranged irregularly can be considered to be formed by arranging many tiny diffraction gratings having different grating constants. Therefore, the display color of the relief structure RS1 can be prevented from appearing iridescently even if the length and width of the reflection surface 22 or the center-to-center distance of the reflection surfaces 22 is made shorter as compared with the case where the reflection surfaces 22 are arranged regularly.

When the relief structure RS1 is provided in each of a plurality of regions, the height of the reflection surface 22 relative to the reflection surface 21 may be made different in some region and other regions. For example, the height of the reflection surface 22 relative to the reflection surface 21 may be made different between region of the "O" letter type and the region of the "O" letter type of the region 13 shown in FIG. 1. In this manner, the letters "T", "O", and "P" can be displayed in different colors.

The height of the reflection surface 22 relative to the reflection surface 21 may be made different within one region. In this case, a mixed color that is difficult to realize when the height of the reflection surface 22 relative to the reflection surface 21 is made equal within one region and that is difficult to reproduce by forgery can be displayed.

The reflection surface 22 preferably has a circular shape or polygonal shape with five vertices or more, particularly a regular polygonal shape. An optical effect exhibited by the relief structure RS1 adopting such a configuration is less dependent on an azimuth angle of the observation direction. The "azimuth angle" is used herein assuming polar coordinates in which the polar axis is perpendicular to the reflection surface 21. Therefore, when the illumination direction or observation direction changes, the display color hardly changes.

The reason why the relief structure RS1 in which the reflection surfaces 22 are arranged irregularly provides the above visual effect will be described with reference to FIGS. 15 and 16.

Figure 15:
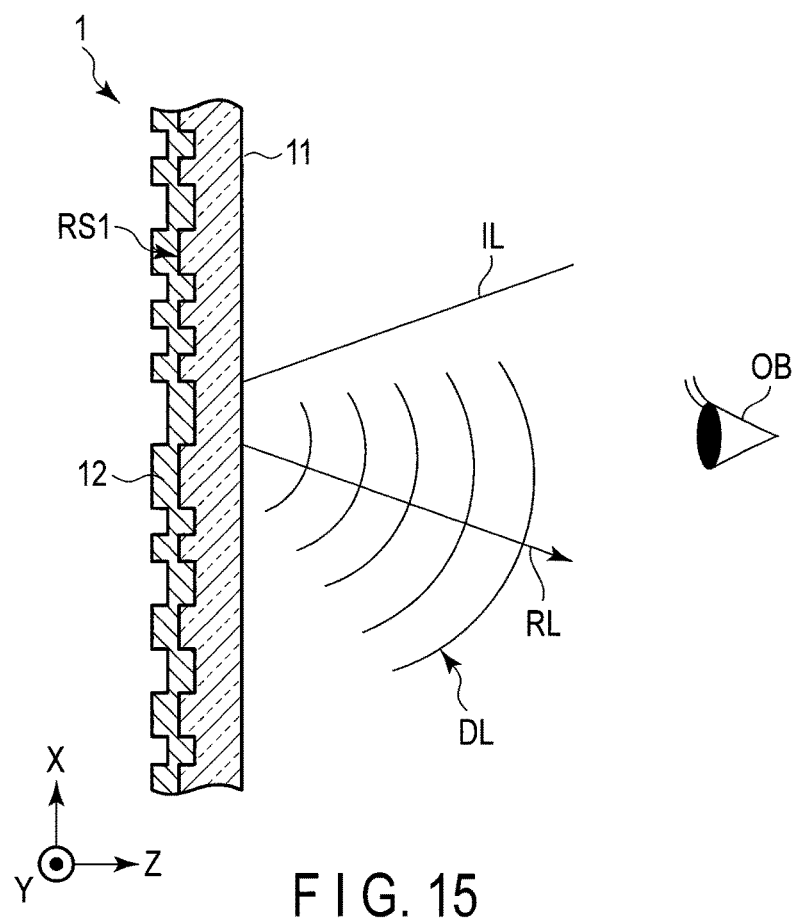
FIG. 15 is a diagram schematically showing the situation in which the first relief structure having the second reflection surfaces irregularly arranged displays a mixed color as a structural color.

FIG. 15 is a diagram schematically showing the situation in which the first relief structure having the second reflection surfaces irregularly arranged displays a mixed color as a structural color. FIG. 16 is a diagram schematically showing the situation in which lights reflected by the first and second reflection surfaces interfere with each other.

As described above, the relief structure RS1 in which the reflection surfaces 22 are arranged irregularly can be considered to be formed by arranging many tiny diffraction gratings having different grating constants. Thus, as shown in FIG. 15, if the display 1 is illuminated with the illumination light IL, the relief structure RS1 reflects the regular reflection light RL and also emits the diffracted light DL having the same wavelength in various directions.

Figure 16:
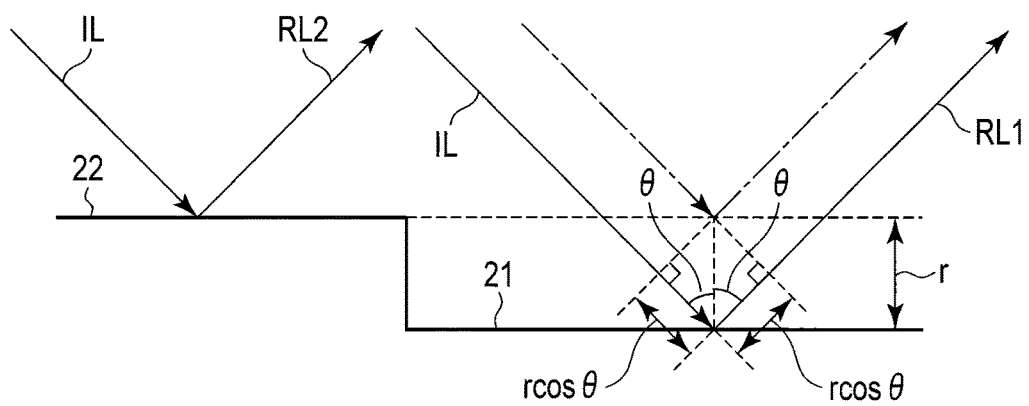
FIG. 16 is a diagram schematically showing the situation in which lights reflected by the first and second reflection surfaces interfere with each other.

When the illumination light IL is incident on the relief structure RS1 at an angle θ, as shown in FIG. 16, the optical path difference between light RL2 reflected by the reflection surface 22 and light RL1 reflected by the reflection surface 21 is twice the product of the height r of the reflection surface 22 relative to the reflection surface 21 and the cos θ. Therefore, if the refractive index of the light-transmitting layer 11 is n, the phase difference of these lights is the product of $2\pi/\lambda$ and 2r cos θ.

When the phase difference is an integral multiple of $2\pi$, the light RL1 and the light RL2 cause constructive interference. In this case, therefore, the relief structure RS1 emits the regular reflection light RL at high intensity and the diffracted light DL at low intensity.

On the other hand, when the phase difference is equal to the sum of a value obtained by multiplying $2\pi$ by an integer and $\pi$, the light RL1 and the light RL2 cause destructive interference. In this case, therefore, the relief structure RS1 emits the regular reflection light. RL at low intensity and the diffracted light DL at high intensity.

Incidentally, a general relief structure that displays a structural color, for example, a diffraction grating or a light-scattering structure has the depth of a recess or the height of a protrusion set to about 0.1 μm. When the visible region is 380 to 780 nm, such a recess or protrusion generates an optical path difference about half the wavelength by reflecting visible light. That is, the phase difference caused by such a recess or protrusion is not such that diffraction efficiency in a partial wavelength band in the wavelength range of the visible region is significantly decreased as compared with the diffraction efficiency in other wavelength bands.

However, if the depth of the recess or the height of the protrusion reaches a certain level of magnitude, lights of certain wavelengths in the visible region cause constructive interfere and lights of other wavelengths cause destructive interfere. As a result, diffraction efficiency in a partial wavelength band in the wavelength range of the visible region becomes significantly smaller than the diffraction efficiency in other wavelength bands.

As has been described with reference to FIG. 15, the relief structure RS1 in which the reflection surfaces 22 are arranged irregularly can be considered to be formed by arranging many tiny diffraction gratings having different grating constants. Thus, the relief structure in which recesses or protrusions are arranged irregularly emits diffracted lights having different wavelengths in the same direction.

Therefore, the relief structure RS displays a mixed color as a structural color. The mixed color displayed by the relief structure RS hardly changes when the observation direction is slightly changed.

This effect is affected by the degree of order of the arrangement of the reflection surfaces 22. Though the complete disorder is ideal, such a structure is difficult to design and produce. Therefore, as will be illustrated below, it is desirable to determine the arrangement of the reflection surfaces 22 by considering the usage form of the display 1.

When an image displayed by the display 1 is observed in a situation in which the light source has a dimension of about 5 cm like a bulb and the distance from the light source to the display 1 is about 2 m, the angle of incidence of illumination light varies in the angular range of about 1.5°. Under such conditions, a diffraction grating whose grating constant is 20 μm or more can emit diffracted light in the same direction for all wavelengths in the visible region. Therefore, if the reflection surfaces 22 are arranged irregularly in all regions of the diameter of 20 μm or more, such a relief structure RS1 does not display a chromatic color originating from a periodic structure.

It is desirable to observe a mixed color originating from the constructive interference and the destructive interference under the conditions under which regular reflection light is not incident on eyes of the observer. Therefore, a larger angle of divergence of diffracted light is desirable.

The intensity distribution of diffracted light can be represented by the following equation (3).

$$I_N = \sin^2\left[\frac{\pi}{\lambda} \times (\sin\Phi) \times a\right] \quad (3)$$

In the equation, $I_N$ denotes the normalized intensity of diffracted light, a denotes the average dimension of the reflection surface 21 or 22, and φ denotes the angle of emergence of diffracted light. The angle of divergence is the minimum angle of emergence φ when the intensity $I_N$ represented by the equation (3) becomes zero. That is, the angle of divergence is the angle of emergence φ satisfying sin φ=λ/a.

Under normal observation conditions, if the angle of divergence is about 20° or more, the display of the mixed color is not hindered by regular reflection light. The visible region is centered around about 500 nm and thus, 500 nm is used here as the wavelength λ. In this case, if the dimension a is 1.5 μm or less, the angle of divergence is about 20° or more can be realized.

Next, the depth or height of the reflection surface 22 relative to the reflection surface 21 will be described.

The intensity of light at which light reflected by the reflection surface 21 and light reflected by the reflection surface 22 do not interfere is approximately proportional to a value calculated from the following equation (4).

$$\sin^2 \frac{2\pi \times n \times r \times \cos\theta}{\lambda} \quad (4)$$

Therefore, the color of diffracted light can approximately be calculated by using color matching functions x(λ), y(λ), and z(λ) and calculating three stimulus values X, Y, and Z according to the following equations (5) to (7).

$$X = \int \left[ x(\lambda) \times \left( \sin^2 \frac{2\pi \times n \times r \times \cos\theta}{\lambda} \right) \times r \times \lambda \right] \quad (5)$$

$$Y = \int \left[ y(\lambda) \times \left( \sin^2 \frac{2\pi \times n \times r \times \cos\theta}{\lambda} \right) \times r \times \lambda \right] \quad (6)$$

$$Z = \int \left[ z(\lambda) \times \left( \sin^2 \frac{2\pi \times n \times r \times \cos\theta}{\lambda} \right) \times r \times \lambda \right] \quad (7)$$

For the height or depth r ranging from 0.10 to 0.30 μm, the color of diffracted light is calculated by assuming that the angle of incidence θ and the refractive index n are 30° and 1.5, respectively. The result of calculation is shown in FIG. 17.

FIG. 17 is a u'v' chromaticity diagram showing an example of color changes caused when the difference between the heights of the reflection surfaces 21 and 22 is changed in the range of 0.10 to 0.30 μm. In FIG. 17, a white circle indicates the display color when the difference between the heights of the reflection surfaces 21 and 22 is zero, that is, white.

As shown in FIG. 17, when the difference between the heights of the reflection surfaces 21 and 22 is about 0.10 μm, white is displayed. When the difference between the heights is about 0.15 μm, yellow is displayed. When the difference between the heights is further increased, chromaticity coordinates rotate around the white chromaticity coordinate. Therefore, it is desirable to set the difference between the heights of the reflection surfaces 21 and 22 to about 0.15 μm or more for the display of chromatic colors.

When the difference between the heights is continuously changed from 0.15 to 0.30 μm, chromaticity coordinates make an approximate round of the white chromaticity coordinate. That is, by setting the difference between the heights to the range of 0.15 to 0.30 μm, all colors can be represented. However, the intensity of green is relatively low.

Next, color changes caused when the difference between the heights of the reflection surfaces 21 and 22 is changed in other ranges under the same conditions as the above conditions. The result thereof is shown in FIGS. 18 and 19.

FIG. 18 is a u'v' chromaticity diagram showing an example of color changes caused when the difference between the heights of the reflection surfaces 21 and 22 is changed in the range of 0.30 to 0.50 μm. FIG. 19 is a u'v' chromaticity diagram showing an example of color changes caused when the difference between the heights of the reflection surfaces 21 and 22 is changed in the range of 0.50 to 0.70 μm.

As shown in FIG. 18, when the difference between the heights of the reflection surfaces 21 and 22 is continuously changed in the range of 0.30 to 0.50 μm, chromaticity coordinates make an approximate round of the white chromaticity coordinate. That is, by setting the difference between the heights to the range of 0.30 to 0.50 μm, all colors can be represented. Moreover, in this case, green can be displayed at relatively high intensity.

As shown in FIG. 19, when the difference between the heights of the reflection surfaces 21 and 22 is set within the range of 0.50 to 0.70 μm, the green and purple colors can be displayed at relatively high intensity. In this case, however, other colors cannot be displayed at high intensity.

It is difficult to form the relief structure RS1 in which the difference between the heights of the reflection surfaces 21 and 22 is large. Therefore, in consideration of points described with reference to FIGS. 17 to 19 and ease of production, the difference between the heights of the reflection surfaces 21 and 22 is preferably set to the range of 0.15 to 0.50 μm, and more preferably set to the range of 0.15 to 0.50 μm.

It becomes more difficult to form the relief structure RS1 with an increasing ratio of the difference between the heights of the reflection surfaces 21 and 22 to the dimension of the reflection surfaces 22. In addition, it becomes more difficult to form the relief structure RS1 with an increasing ratio of the difference between the heights of the reflection surfaces 21 and 22 to the distance between the reflection surfaces 22. The ratio is preferably 1 or less. The difference between the heights of the reflection surfaces 21 and 22 is preferably 0.50 μm or less and thus, the dimension of the reflection surface 22 is preferably 0.50 μm or more and the distance between the reflection surfaces 22 is preferably 0.50 μm or more. Therefore, the center-to-center distance of the reflection surfaces 22 is preferably 1.0 μm or more.

Next, calculation results carried out regarding the angle of incidence of illumination light and the display color will be described.

As described above, the optical path difference between light reflected by the reflection surface 22 and light reflected by the reflection surface 21 is expressed as 2nr cos θ. As is evident from the formula, the display color can be affected not only by the difference between the heights of the reflection surfaces 21 and 22, but also by the angle of incidence θ at which illumination light propagating through the light-transmitting layer 11 is incident on the relief structure RS1.

The angle of incidence θ can be determined from an angle of incidence $\theta_0$ at which illumination light propagating through the air is incident on the resin layer 11 by using the Snell's law. By using the angle of incidence θ obtained in this manner, color changes caused when the angle of incidence $\theta_0$ is continuously changed from 0° to 90° are investigated by the same method as described above. In this case, the refractive index n of the resin layer 11 and the difference r between the heights of the reflection surfaces 21 and 22 are assumed to be 1.5 and 0.30 μm, respectively. The result thereof is shown in FIGS. 20 and 21.

FIG. 20 is a u'v' chromaticity diagram showing an example of color changes caused when the angle of incidence $\theta_0$ of illumination light is continuously changed in the range of 0° to 90°. FIG. 21 is a u'v' chromaticity diagram showing an example of color changes caused when the angle of incidence $\theta_0$ of illumination light is continuously changed in the range of 20° to 40°.

As shown in FIG. 20, when the angle of incidence $\theta_0$ is changed from 0° to 90°, the display color changes from orange to cyan. That is, if the angle of incidence $\theta_0$ is significantly changed, the change of the display color can be perceived.

Figure 21:
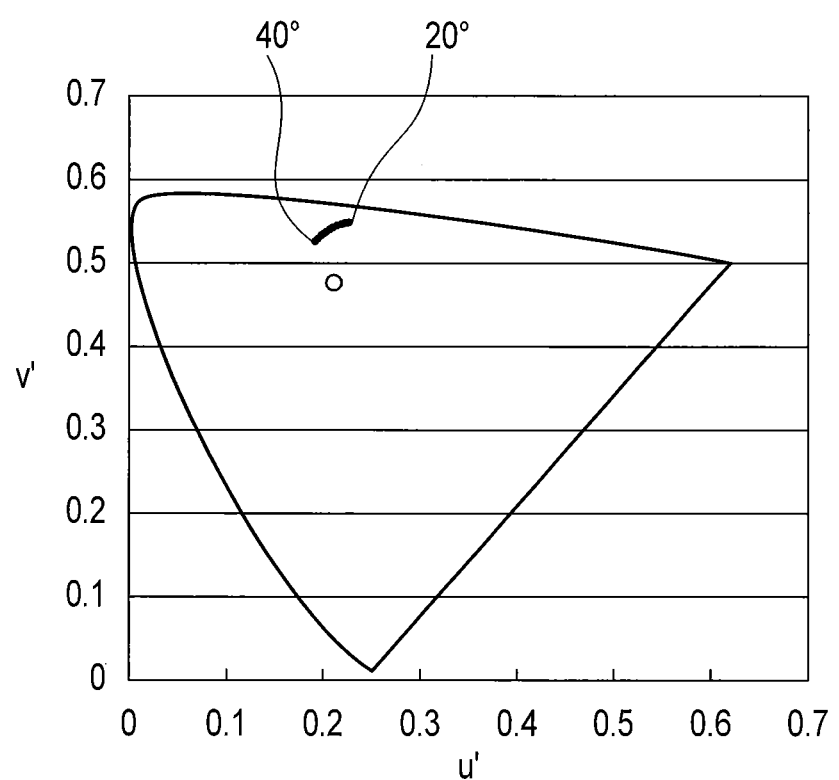
FIG. 21 is a u'v' chromaticity diagram showing an example of color changes caused when the angle of incidence $\theta_0$ of illumination light is continuously changed in the range of 20° to 40°.

As shown in FIG. 21, when the angle of incidence $\theta_0$ is changed from 20° to 40°, the change of the display color in accordance with the angle of incidence $\theta_0$ is small. In this range, the display color is yellow regardless of the angle of incidence $\theta_0$. That is, when the angle of incidence $\theta_0$ changes slightly under normal observation conditions, the display color of the relief structure RS1 does not change. Therefore, under normal observation conditions, the display color of the relief structure RS1 does not change when the observation direction changes slightly.

A diffraction grating or a light-scattering structure similar to the relief structure RS1 has been known, but such a diffraction grating or light-scattering structure does not shows the above coloring effect. This will be described below.

FIG. 22 is a sectional view schematically showing an example of the diffraction grating. FIG. 23 is a sectional view schematically showing another example of the diffraction grating.

The diffraction gratings RS shown in FIGS. 22 and 23 are relief structures. These diffraction gratings RS have a structure in which a plurality of grooves GR are arranged in the width direction. In each of the diffraction gratings RS, the width of the groove GR and the distance between center lines are constant.

The diffraction grating RS shown in FIG. 22 has a section perpendicular to the length direction of the groove GR in a sinusoidal shape. On the other hand, the diffraction grating RS shown in FIG. 23 has a section perpendicular to the length direction of the groove GR in a rectangular wave shape.

The diffraction grating RS shown in FIG. 22 does not contain any plane corresponding to the reflection surfaces 21 and 22. Thus, the light-scattering structure RS does not show the coloring effect described by using the above formula.

The diffraction grating RS shown in FIG. 23 contains reflection surfaces 21' and 22' corresponding to the reflection surfaces 21 and 22, but is not formed with precision in shape sufficient to show the coloring effect described by using the above formula. More specifically, the reflection surfaces 21' and 22' have fine relief or the height of the reflection surface 22' relative to the reflection surface 21' is non-uniform. This results from the facts that it is difficult to form a diffraction grating or light-scattering structure with precision in shape sufficient to show the coloring effect described by using the above formula by a normal production process and high precision in shape is not required particularly for the light-scattering structure and rather, an irregular shape is advantageous in terms of light-scattering power.

The diffraction grating is generally used for spectral purposes. The diffraction grating used for such spectral purposes does not normally adopt a configuration in which diffracted lights having different wavelengths are emitted in a narrow angular range.

In a general relief-type light-scattering structure, the depth of the recess or the height of the protrusion is 0.1 μm or less. In such a case, the coloring effect described by using the above formula cannot be obtained. That is, in such a case, an effect of making the diffraction efficiency in a partial wavelength band in the wavelength range of the visible region, for example, about 380 nm to about 700 nm or about 380 nm to about 780 nm sufficiently smaller than the diffraction efficiency in other wavelength bands is not obtained.

(Second Relief Structure)

As shown in FIG. 2, the second relief structure RS2 is provided on the surface of the relief structure formation layer 112. The second relief structure RS2 displays a structural color. The second relief structure RS2 shows an optical effect different from that of the first relief structure RS1. Incidentally, the second relief structure RS2 may be omitted.

The second relief structure RS2 is, for example, a diffraction grating or a hologram. Alternatively, the second relief structure RS2 is a light-scattering structure that displays an achromatic color regardless of the observation direction. Alternatively, the second relief structure RS2 is a light-absorbing structure. Alternatively, the second relief structure RS2 is a combination of at least two of the above. The light-scattering structure and the light-absorbing structure will be described later with reference to drawings.

As described above, the second relief structure RS2 shows an optical effect that is different from the optical effect of the first relief structure RS1. Thus, in the case where the second relief structure RS2 is provided, compared with a case where the second relief structure RS2 is omitted, characteristic optical effects shown by the first relief structure RS1 are conspicuous. Moreover, if the second relief structure RS2 is provided, a more complex visual effect can be achieved, making a forgery of the display 1 more difficult.

More specifically, if the display 1 contains a diffraction structure such as a diffraction grating and hologram as the second relief structure RS2, the display 1 can be caused to display iridescent spectral colors. Also in this case, image switching as described above can be realized and the second relief structure RS2 can be caused to display a stereoscopic image by using changes in wavelength and intensity of diffracted light in accordance with the illumination direction and the observation direction.

The grating constant of the diffraction grating is, for example, in the range of 0.3 to 3 μm. The depth of groove of the diffraction grating is, for example, 0.1 μm or less.

When a light-absorbing structure or a light-scattering structure that displays an achromatic color regardless of the observation direction is adopted to the second relief structure RS2, the following visual effect is obtained.

Figure 24:
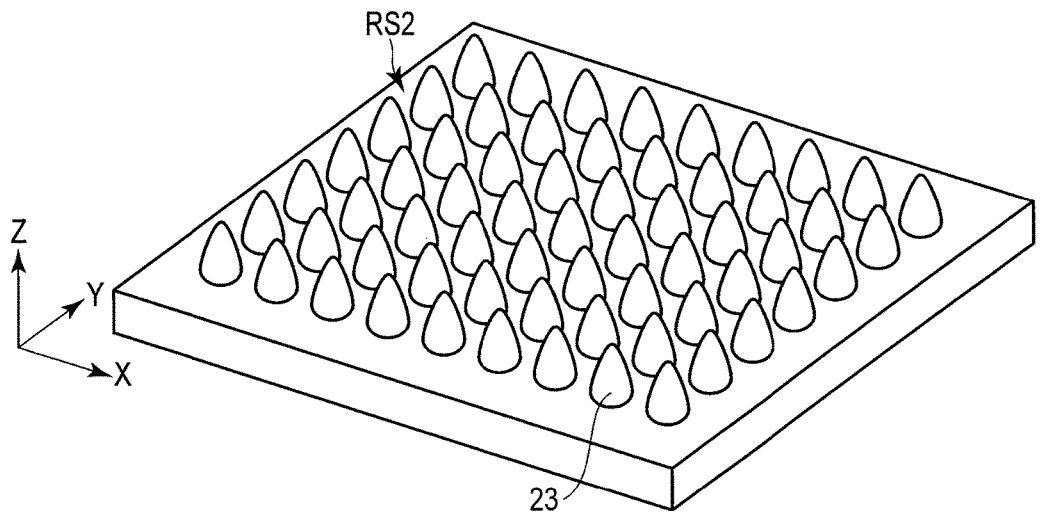
FIG. 24 is a perspective view schematically showing an example of the structure that can be adopted for the second relief structure.
Figure 25:
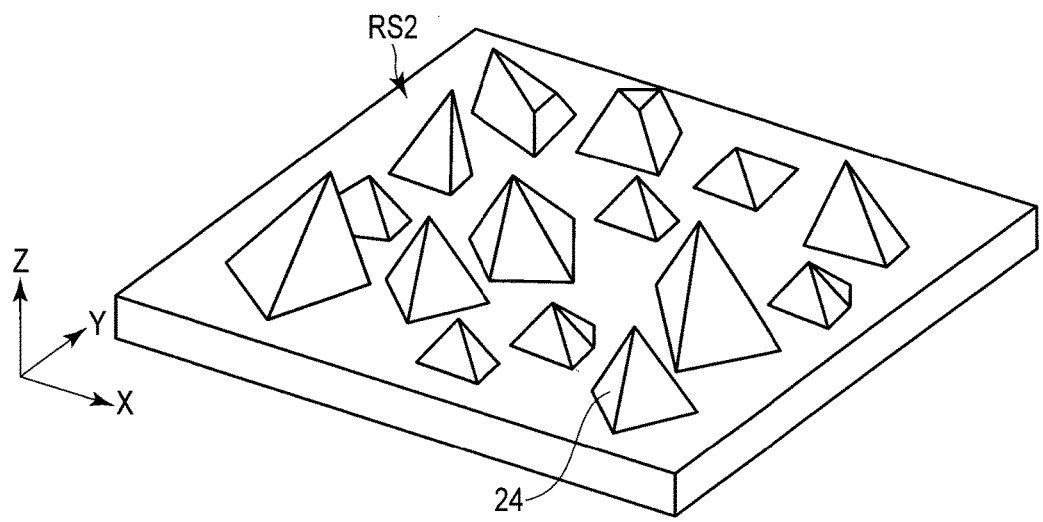
FIG. 25 is a perspective view schematically showing another example of the structure that can be adopted for the second relief structure.

FIG. 24 is a perspective view schematically showing an example of the structure that can be adopted for the second relief structure. FIG. 25 is a perspective view schematically showing another example of the structure that can be adopted for the second relief structure.

The second relief structure RS2 shown in FIG. 24 is a light-absorbing structure. The second relief structure RS2 contains a plurality of protrusions or recesses 23 each having a tapered shape. In FIG. 24, as an example, protrusions in a substantially conical shape are depicted as the protrusions or recesses 23. The shape of the protrusions or recesses 23 may be pyramidal.

The protrusions or recesses 23 are arranged two-dimensionally with a center-to-center distance shorter than the shortest wavelength of the visible region or with a center-to-center distance of 400 nm or less. It is assumed here, as an example, that the protrusions or recesses 23 are arranged regularly in the X and Y directions.

The height or depth of the protrusions or recesses 23 is, for example, 300 μm and typically in the range of 300 μm and 450 μm. When the center-to-center distance is sufficiently short, an antireflection effect increases with an increasing height or depth. However, it is difficult to form the protrusions or recesses 23 that are too high or deep with high precision.

The protrusions or recesses 23 are arranged regularly. In this case, when the relief structure RS2 is illuminated with white light from an oblique direction, the relief structure RS2 does not emit diffracted light in the angular range in which regular reflection light is observable and instead, emits diffracted light in the angular range in which regular reflection light is not observable. That is, if the angle of normal of the display surface is 0° and the angular range including the illumination direction is defined as the positive angular range, the relief structure RS2 does not emit diffracted light in the negative angular range and instead, emits diffracted light in the positive angular range. That is, the relief structure RS2 in which the protrusions or recesses 23 are arranged regularly displays an achromatic color, for example, a dark gray or black under normal observation conditions and displays spectral colors under special observation conditions.

The arrangement of the protrusions or recesses 23 may be irregular. In such a case, the relief structure RS2 displays, for example, a dark gray or black regardless of observation conditions.

The relief structure RS2 shown in FIG. 25 is a light-scattering structure. The relief structure RS2 contains a plurality of protrusions or recesses 24. In FIG. 25, as an example, protrusions in a tapered shape are depicted as the protrusions or recesses 24. The protrusions or recesses 24 have various dimensions and shapes and are arranged irregularly. Many of the protrusions or recesses 24 have the maximum dimension perpendicular to the Z axis of, for example, 3 µm or more and the dimension in the Z direction of, for example, 1 µm or more. When the relief structure RS2 is illuminated with white light, the relief structure RS2 displays an achromatic color, for example, white regardless of the illumination direction and the observation direction.

When the protrusions or recesses 24 are arranged irregularly, at least one of the dimension and shape may be equal. The protrusions or recesses 24 may have a shape extending in one direction perpendicular to the Z direction. In this manner, a light-scattering anisotropy can be provided to the relief structure RS2. That is, in this case, light-scattering power of the relief structure RS2 is changed when the display 1 is rotated around an axis parallel to the Z axis while illuminating the display 1 from an oblique direction.

The above display 1 is produced by, for example, the following method.

First, formed is the relief structure formation layer 112 having the relief structure RS1 and the relief structure RS2 provided on the surface of the substrate 111.

To obtain the above effect regarding the relief structure RS1, it is necessary to form the relief structure RS1 with extremely high precision. The relief structure RS1 superior in shape precision and dimension precision can be formed by one of the first to third methods described below.

According to the first method, first, a resin layer having a uniform thickness is formed on a smooth surface. As the material of the resin layer, for example, a material insolubilized or solubilized for a developer by irradiation with a charged particle beam such as an electron beam. Next, a predetermined pattern is formed on the resin layer by a charged particle beam such as an electron beam. Then, the resin layer is subjected to development to obtain a pattern corresponding to the reflection surface 21 or 22.

The top surface of the pattern obtained in this manner has a relief whose depth or height is, for example, 10 nm. Then, the pattern is heated to smooth the top surface. To cause a thermal flow only on the top surface, a hot air of 100° C. to 150° C. is blown on the top surface of the pattern. The heating is complete in a short time such as 1 to 5 seconds so that the shape of the side surface of the pattern should not change considerably. The heating is carried out by, for example, cooling the pattern from the undersurface side.

The second method is the same as the first method except that smoothing is done by the following method. That is, according to the second method, a pattern having a relief on the upper side thereof is subjected to ashing using, for example, oxygen plasma. This removes a portion of the top surface of the pattern to smooth the top surface.

The first and second methods are simple, but optimization of conditions and the like is not easy. According to the third method described below, though the production process becomes more complex, high shape precision and dimension precision can be realized more easily.

The third method is the same as the first method except that smoothing is done by the following method. That is, according to the third method, after forming a pattern having an opening and a top surface with surface asperities, a second material having a higher softening point than a first material constituting the pattern is applied to the entire surface. Accordingly, the opening of the pattern is filled with the second material. Next, the surface of the film of the second material is polished until the top surface of the pattern made of the first material is exposed. Then, a flat plate having a smooth surface is heated to a temperature equal to or higher than the softening point of the first material and lower than the softening point of the second material while pressing the flat plate against the pattern made of the first material and the film made of the second material. Accordingly, a thermal flow of the first material on the top surface of the pattern is caused. Next, the first material is sufficiently cooled while the flat plate being pressed. After the first material is completely set, the flat plate is removed and further, the film made of the second material is removed. In this manner, a pattern having a smooth top surface is obtained.

A pattern obtained according to one of the above methods can be used itself as at least a portion of the relief structure formation layer 112. Alternatively, it is possible to produce a metallic stamper from the master by electroforming or the like using a structure obtained according to one of the above methods as a master and form the relief structure formation layer 112 using the stamper. The electroforming is a kind of surface treatment technique that forms a metal film on an object by reducing metallic ions on the surface of the object immersed in a predetermined aqueous solution. By using the above methods, a fine relief structure provided on the surface of a master can be duplicated with precision. Incidentally, the surface of an object on which electroforming is performed needs to be electrically conducting. Generally, a photosensitive resist does not conduct electricity and thus, a thin metal film is provided on the surface of the object by vapor phase deposition such as sputtering and vacuum evaporation before electroforming.

Next, the stamper is used to duplicate the relief structures RS1 and RS2. That is, first, a thermoplastic resin or a photo-curable resin is applied onto the substrate 111 made of, for example, polycarbonate or polyester. Next, the metallic stamper is brought into close contact with the applied film and in this state, the resin layer is heated or irradiated with light. After the resin being set, the metallic stamper is removed from the set resin. Accordingly, the relief structure formation layer 112 provided with the relief structures RS1 and RS2 is obtained.

Next, a single layer or a plurality of layers of a metal such as aluminum or a dielectric is deposited on the relief structure formation layer 112 by, for example, evaporation method. Accordingly, the reflection layer 12 is obtained. In this way, the display 1 is completed.

Second Embodiment

Next, the second embodiment of the present invention will be described.

A display according to the second embodiment is the same as the display 1 according to the first embodiment except that a structure described below is adopted for a region 13.

Figure 27:
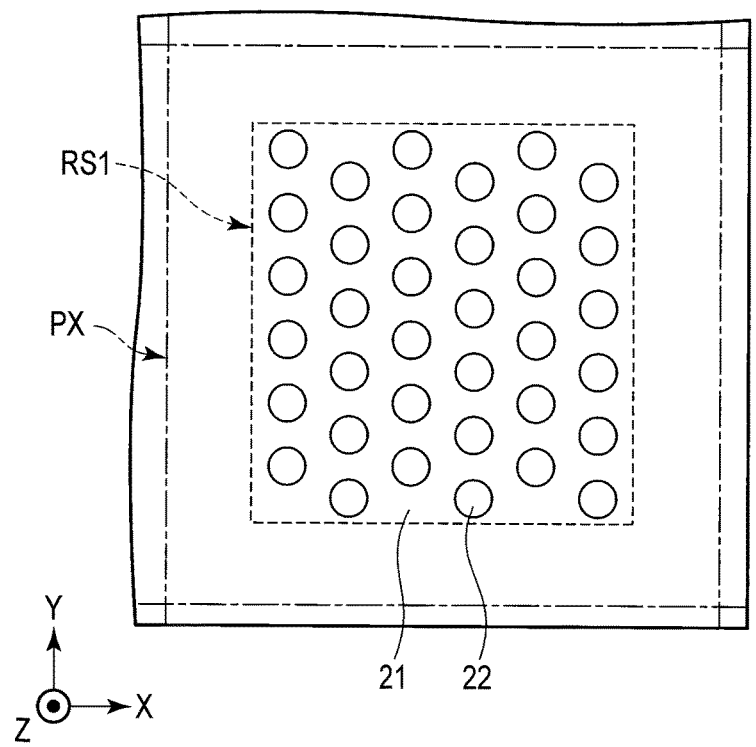
FIG. 27 is an enlarged plan view showing a portion of the structure shown in FIG. 26.
Figure 28:
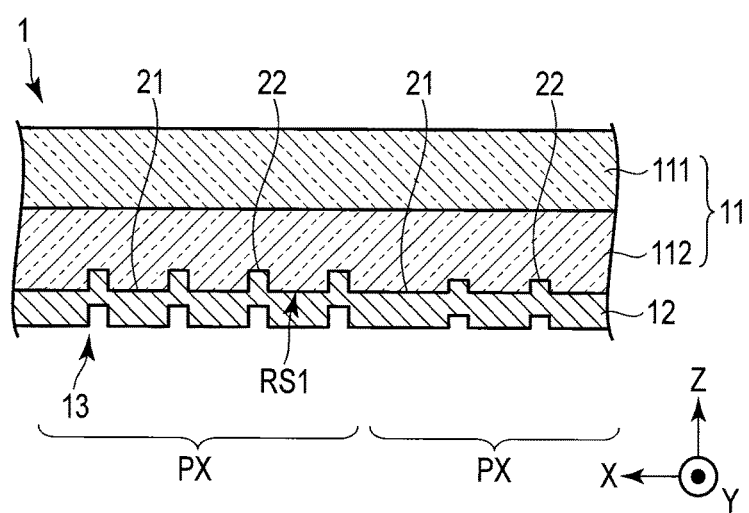
FIG. 28 is a sectional view taken along an XXI-XXI line of the structure shown in FIG. 26.

FIG. 26 is a plan view schematically showing an example of the structure that can be adopted for a display according to the second embodiment of the present invention. FIG. 27 is an enlarged plan view showing a portion of the structure shown in FIG. 26. FIG. 28 is a sectional view taken along an XXI-XXI line of the structure shown in FIG. 26.

FIG. 26 depicts pixels PX arranged regularly in the X and Y directions. Each pixel PX has a right-angle quadrangular shape, for example, a square shape. As will be described later, some pixels PX include a relief structure RS1 and other pixels PX include a relief structure RS2.

The pixel PX is designed so that the longest side thereof has a dimension in the range of 3 μm to 300 μm. When the dimension of the pixel PX is large, an image cannot be displayed in high resolution. When the dimension of the pixel PX is small, it becomes difficult to form a sufficient number of protrusions or recesses with precision in the pixel PX.

The pixels PX arranged in the region 13 include the relief structure RS1. The relief structure RS1 is the same as the relief structure RS1 described with reference to FIGS. 5 and 6.

On the other hand, the pixels PX arranged in a region 17 include the relief structure RS2. The relief structure RS2 here is a diffraction grating in which the length direction of groove is inclined to the X direction.

In the region 13, a ratio S/S0 of an area S of the relief structure RS1 to an area S0 of the pixel PX is different from place to place. FIG. 26 depicts three pixels PX having different ratios S/S0.

The contour of the pixel PX is determined based on the arrangement direction and period of the relief structure RS1 and an arrangement pattern of a reflection surface 22. In this case, the arrangement direction, period, and shape of the relief structure RS2 may be considered if necessary. The contour of the relief structure RS1 is assumed, as shown in FIG. 27, to be a polygon of a minimum area of polygons enclosing all the reflection surfaces 22 contained in the relief structure RS1 and whose interior angles are all less than 180°.

The relief structure RS1 is positioned in the center of the pixel PX. The relief structure RS1 may not be positioned in the center of the pixel PX. The position of the relief structure RS1 relative to the center of the pixel PX may be equal or different among the pixels PX.

Two or more of the pixels PX having the equal ratio S/S0 have the equal height or depth of the reflection surface 22 relative to a reflection surface 21. Then, two or more of the pixels PX having different ratios S/S0 have, as shown in FIG. 28, mutually different heights or depths of the reflection surface 22 relative to the reflection surface 21.

The radio S/S0 affects the saturation of color displayed by the pixel PX. The height or depth of the reflection surface 22 relative to the reflection surface 21 affects the hue of color displayed by the pixel PX. Therefore, if the above configuration is adopted, a more complex display can be made.

The pixels PX can be arranged in various ways.

Figure 29:
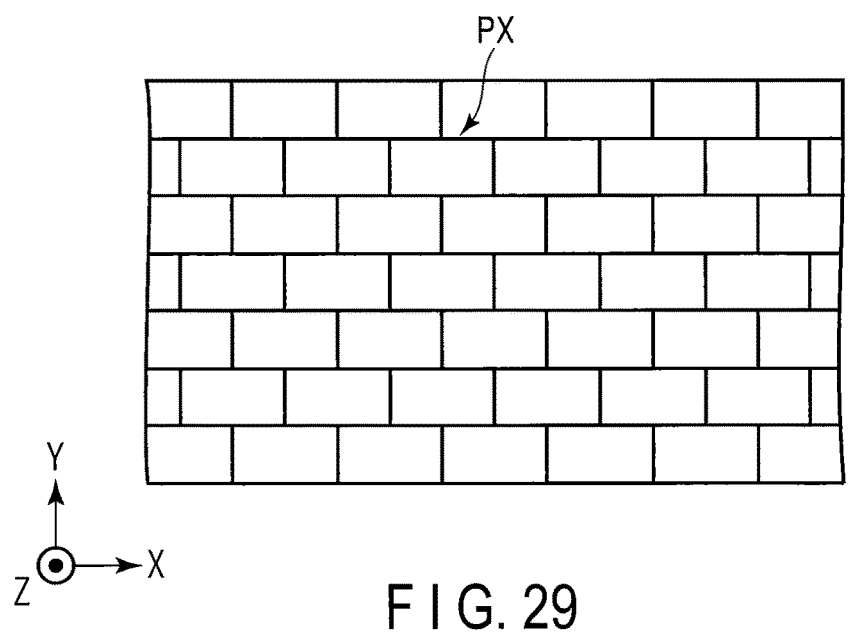
FIG. 29 is a plan view schematically showing an example of the arrangement of pixels.
Figure 30:
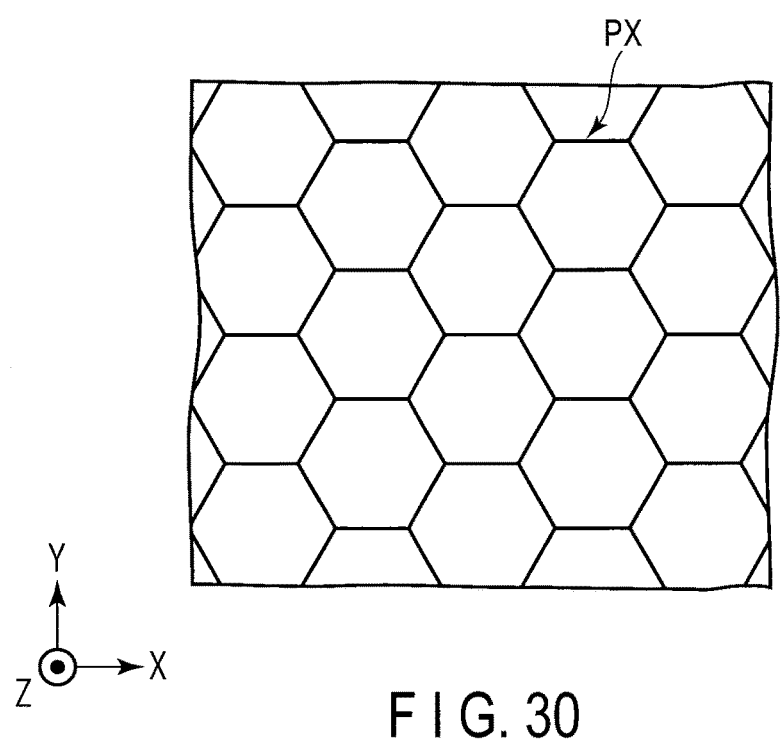
FIG. 30 is a plan view schematically showing another example of the arrangement of pixels.

FIG. 29 is a plan view schematically showing an example of the arrangement of pixels. FIG. 30 is a plan view schematically showing another example of the arrangement of pixels.

In FIG. 29, the pixels PX each having a rectangular shape are arranged in a direction inclined to the X direction and in the Y direction. In FIG. 30, the pixels PX each having a hexagonal shape are arranged in a direction inclined to the X direction and in the Y direction. When the pixels PX in the same shape are arranged two-dimensionally and regularly as above, it is easy to design a display 1 and also easy to produce the display 1 on demand. The display 1 may contain a plurality of regions that are different in at least one of shape and arrangement of the pixels PX.

The pixel PX may have other shapes. For example, the pixel PX may have a quadrangular shape other than the square and rectangular shapes such as a parallelogram. Alternatively, the pixel PX may have a triangular shape. The pixels PX having these shapes can be arranged without gap.

Two arrangement directions of the pixels PX may be oblique to each other or perpendicular to each other.

When the structure described with reference to FIGS. 26 to 28 is adopted, gradations in hue and saturation can be realized.

Figure 31:
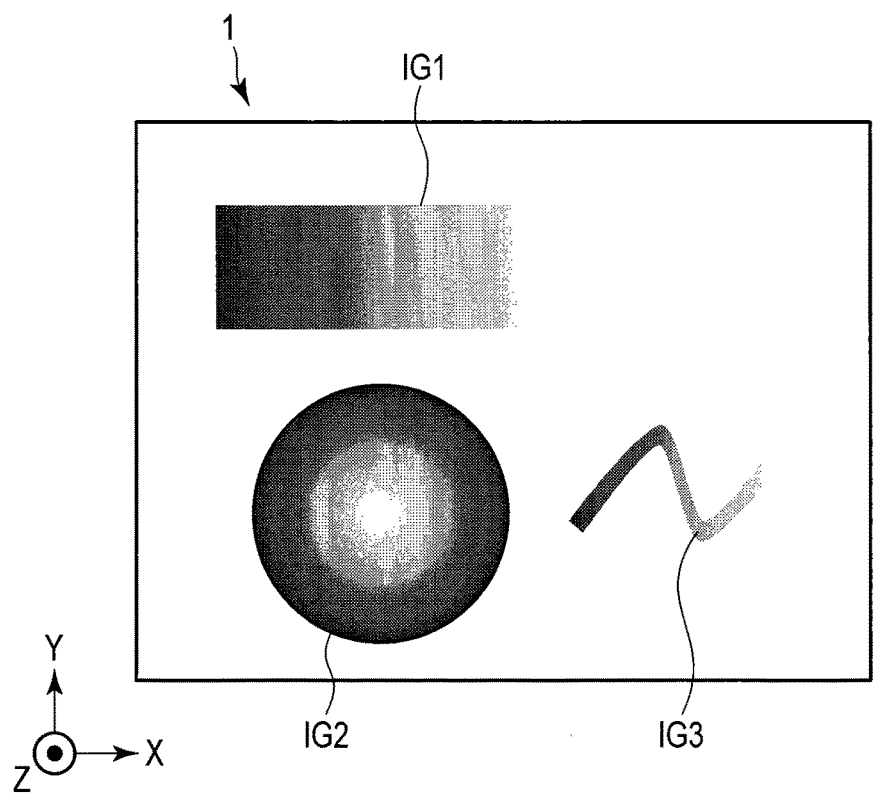
FIG. 31 is a diagram schematically showing examples of images that can be displayed by the display according to the second embodiment of the present invention.

FIG. 31 is a diagram schematically showing examples of images that can be displayed by the display according to the second embodiment of the present invention.

The display 1 shown in FIG. 31 displays images IG1 to IG3. In portions corresponding to the images IG1 to IG3 of the display 1, the ratio S/S0 of the area S of the relief structure RS1 to the area S0 of the pixel PX is different from place to place. The pixels PX having the equal ratio S/S0 have the equal height or depth of the reflection surface 22 relative to the reflection surface 21. The pixels PX having the equal ratio S/S0 have mutually different heights or depths of the reflection surface 22 relative to the reflection surface 21.

More specifically, in the portion corresponding to the image IG1 of the display 1, the ratio S/S0 decreases from left to right. For example, pixels PX each having the same structure as that of the pixel PX shown at the upper left of FIG. 26 are arranged at the left-edge region, pixel PX each having the same structure as that of the pixel PX shown at the upper right of FIG. 26 are arranged at the right-edge region, and the pixels PX each having the same structure as that of the pixel PX shown at the lower left of FIG. 26 are arranged in the intermediate region. The height or depth of the reflection surface 22 relative to the reflection surface 21 decreases from left to right in this portion. Therefore, the saturation decreases from left to right in the image IG1 while changing the hue.

In the portion corresponding to the image IG2 of the display 1, the ratio S/S0 decreases from the circumference to the center. For example, pixels PX each having the same structure as that of the pixel PX shown at the upper left of FIG. 26 are arranged in the circumferential region, pixels PX each having the same structure as that of the pixel PX shown at the upper right of FIG. 26 are arranged in the center region, and pixels PX each having the same structure as that of the pixel PX shown at the lower left of FIG. 26 are arranged in the intermediate region. The height or depth of the reflection surface 22 relative to the reflection surface 21 decreases from the circumference to the center in this portion. Therefore, the saturation decreases from the circumference to the center in the image IG2 while changing the hue.

In the portion corresponding to the image IG3 of the display 1, the ratio S/S0 decreases from left to right. For example, pixels PX each having the same structure as that of the pixel PX shown at the upper left of FIG. 26 are arranged at the left-edge region, pixels PX each having the same structure as that of the pixel PX shown at the upper right of FIG. 26 are arranged at the right-edge region, and pixels PX each having the same structure as that of the pixel PX shown at the lower left of FIG. 26 are arranged in the intermediate region. The height or depth of the reflection surface 22 relative to the reflection surface 21 decreases from left to right in this portion. Therefore, the saturation decreases from left to right in the image IG3 while changing the hue.

Thus, if the above configuration is adopted, a more complex display can be made. It is more difficult to forge the display 1 that displays such an image.

In the above configuration, as compared with the pixel PX having a smaller ratio S/S0, the pixel PX having a larger ratio S/S0 has a greater height or depth of the reflection surface 22 relative to the reflection surface 21. Conversely, as compared with the pixel PX having a smaller ratio S/S0, the pixel PX having a larger ratio S/S0 may have a smaller height or depth of the reflection surface 22 relative to the reflection surface 21. However, if the height or depth of the reflection surface 22 relative to the reflection surface 21 is made smaller, the diffraction efficiency decreases. Therefore, in order to change the saturation significantly, the pixel PX having a larger ratio S/S0 preferably has a greater height or depth of the reflection surface 22 relative to the reflection surface 21 as compared with the pixel PX having a smaller ratio S/S0.

Here, as an example, the reflection surfaces 22 each having a circular shape are regularly arranged in each of the relief structures RS1. Similar to the first embodiment, the reflection surface 22 may have different shapes.

Third Embodiment

Next, the third embodiment of the present invention will be described.

A display according to the third embodiment is the same as the display 1 according to the first or second embodiment except that a print layer is contained.

Figure 32:
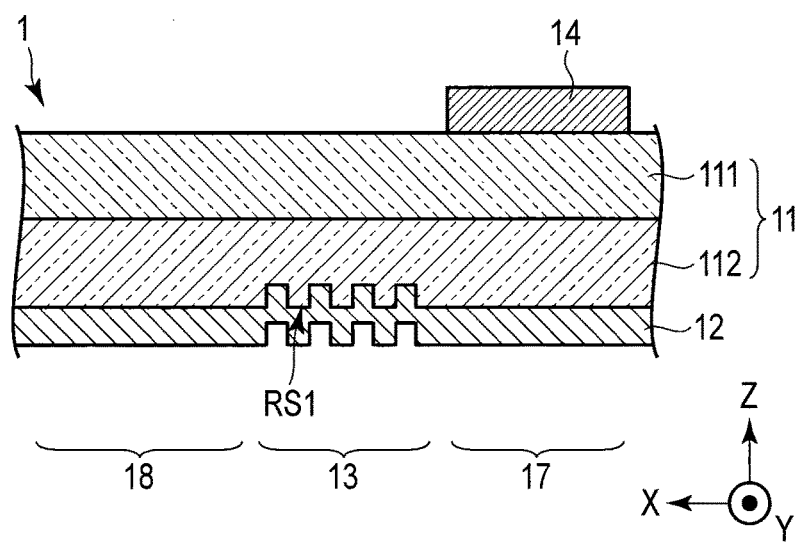
FIG. 32 is a sectional diagram schematically showing an example of the structure that can be adopted for a display according to the third embodiment of the present invention.
Figure 33:
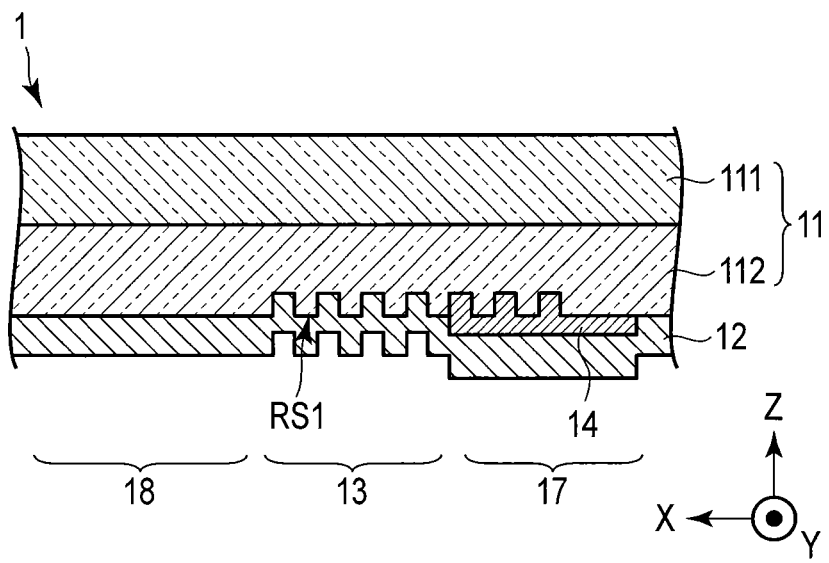
FIG. 33 is a sectional diagram schematically showing another example of the structure that can be adopted for a display according to the third embodiment of the present invention.
Figure 34:
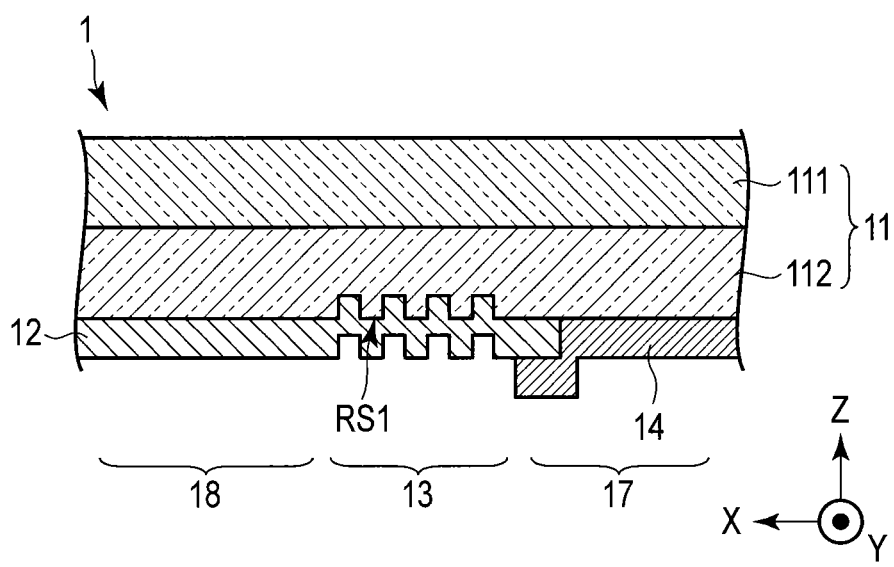
FIG. 34 is a sectional diagram schematically showing still another example of the structure that can be adopted for a display according to the third embodiment of the present invention.

FIG. 32 is a sectional diagram schematically showing an example of the structure that can be adopted for a display according to the third embodiment of the present invention. FIG. 33 is a sectional diagram schematically showing another example of the structure that can be adopted for a display according to the third embodiment of the present invention. FIG. 34 is a sectional diagram schematically showing still another example of the structure that can be adopted for a display according to the third embodiment of the present invention.

The display 1 shown in FIGS. 32 to 34 has a print layer 14 provided at a position corresponding to a region 17. As shown in FIG. 32, the print layer 14 may be provided to face a relief structure formation layer 112 with a substrate 111 interposed therebetween. Alternatively, the print layer 14 may be provided, as shown in FIG. 33, between the relief structure formation layer 112 and a reflection layer 12. Alternatively, as shown in FIG. 34, the print layer 14 may be provided to face the relief structure formation layer 112 with the reflection layer 12 interposed therebetween.

As shown in FIGS. 32 and 34, the relief structure may be omitted from the surface of the relief structure formation layer 112 at the position of the print layer 14. Alternatively, as shown in FIG. 33, the relief structure may be provided on the surface of the relief structure formation layer 112 at least at a portion of the region corresponding to the print layer 14. As shown in FIG. 34, at least a portion of the reflection layer 12 may be omitted at the position of the print layer 14.

When the print layer 14 is provided between the relief structure formation layer 112 and the reflection layer 12 as shown in FIG. 33, the refractive index of the print layer 14 is preferably approximately equal to that of the material constituting the relief structure formation layer 112. In this case, a portion of the relief structure in contact with the print layer 14 can be prevented from displaying a structural color.

When the reflection layer 12 and the print layer 14 are formed on the relief structure formation layer 112 in this order as shown in FIG. 34, the reflection layer 12 is formed, for example, such that the reflection layer 12 covers only a portion of the surface of the relief structure formation layer 112. In this case, the print layer 14 is formed, for example, such that the print layer 14 at least partially covers the region of the surface of the relief structure formation layer 112 where the reflection layer 12 is not formed. In this case, even if the reflection layer 12 does not have light-transmitting properties, an image corresponding to a pattern of the print layer 12 can be perceived by observing the display 1 from the side on the substrate 111.

The print layer 14 displays, for example, images such as letters, patterns, and symbols. The print layer 14 is formed of ink or toner and displays chromatic colors or achromatic colors having hue, lightness, and saturation specific to the ink or toner.

As the ink, for example, offset printing ink, letterpress ink, or rotogravure ink is used in accordance with the printing method. The ink used for printing can be classified by composition like resin-type ink, oil-based ink, and water-based ink. Alternatively, the printing ink can be classified by method of drying like oxidative polymerization ink, penetration-drying ink, evaporation-drying ink, and UV-curing ink. The printing ink is selected appropriately in accordance with the type of substrate and the printing method.

As the toner, for example, plastic particles having electrostatic properties to which color particles such as graphite and pigments are adhere are used. The print layer 14 may be formed by causing such toner to transfer to a substrate such as a polyethylene terephthalate (PET) film and paper by using static electricity and fusing the toner by heating.

When common printing ink or toner is used, the display color of the print layer 14 does not change significantly in accordance with the angle of incidence of illumination light or the observation direction. On the other hand, the relief structure RS1 displays the structural color when observed from the normal direction and does not display the structural color when observed at a small angle with respect to the display surface. Thus, by comparing the display color of the print layer 14 with the display color of the relief structure RS1, features thereof are made conspicuous. Therefore, a high level of forgery prevention effect can be realized by combining the relief structure RS1 and the print layer 14.

By appropriately combining the type of ink or toner, the concentration of pigment or dye, and the printing method, the identification of a region 13 and the region 17 of the display 1 may be made impossible or difficult when observed, for example, from the normal direction. That is, the display 1 may be configured such that the region 13 and the region 17 display approximately the same color when observed, for example, from the normal direction. As described above, the region 13 does not change the display color when the observation direction is changed slightly from the normal direction. However, if the angle of the observation direction formed with the display surface is sufficiently small, the region 13 displays a thinner structural color or does not display the structural color. Thus, in this case, the region 13 and the region 17 can be discriminated from each other.

That is, the print layer 14 and the relief structure RS1 display a latent image when the print layer 14 and the relief structure RS1 are illuminated with white light from, for example, the normal direction and regular reflection light is observed. Then, the print layer 14 and the relief structure RS1 display a visible image when the print layer 14 and the relief structure RS1 are illuminated with white light from an oblique direction and regular reflection light is observed.

Therefore, by adopting the above configuration, a more complex visual effect can be achieved.

An example of such a visual effect will be described with reference to FIGS. 35 and 36.

FIG. 35 is a plan view schematically showing an example of the image displayed by the display according to the third embodiment of the present invention when an observer observes it from the normal direction. FIG. 36 is a perspective view schematically showing an example of the image displayed by the display shown in FIG. 35 when an observer observes it from an oblique direction.

The display 1 shown in FIGS. 35 and 36 is the same as the display 1 described with reference to FIGS. 1 and 2 except that the following configuration is adopted. That is, the display 1 does not contain a region 18, and the region 17 is provided with the print layer 14 described with reference to FIGS. 32 to 34. The print layer 14 is formed of normal ink or toner and hardly causes the change in color in accordance with the observation direction. When the display 1 is observed from the normal direction, as shown in FIG. 35, approximately the same color is displayed by the region 13 and the region 17.

When the observation direction of the display 1 is sufficiently inclined, as shown in FIG. 36, the display color of the region 13 changes. That is, a latent image is visualized by inclining the observation direction sufficiently.

Functional ink whose color changes in accordance with the wavelength of illumination light or the observation direction may be used as printing ink. As the functional ink whose color changes in accordance with the wavelength of illumination light, for example, fluorescent ink or phosphorescent ink can be used. As the functional ink whose color changes in accordance with the observation direction, for example, optically variable ink, color shift ink, pearl ink, or retroreflective ink can be used.

The fluorescent ink is ink including a fluorescent pigment. The fluorescent ink displays a specific color when irradiated with ultraviolet rays. The phosphorescent ink emits light in a dark place for a long time after being stimulated by light.

The optically variable ink and color shift ink make a color change, for example, from red to green or from blue to purple in accordance with the observation direction. The pearl ink displays a pale pearl color when observed from a specific direction. The retroreflective ink reflects illumination light in a direction approximately equal to the incident direction with a high reflectivity.

For persons who are unfamiliar with an act of making a true-false judgment using the color change of the region 13, a true-false judgment using the color change of the region 17 is easy. When the true-false judgment using the color change of the region 13 and the true-false judgment using the color change of the region 17 are combined, a more reliable true-false judgment can be made. Particularly, if the display color of the region 17 changes in accordance with the observation direction, the observer can be made to perceive color changes of both the region 13 and the region 17 at the same time by causing the observation angle at which the display color of the region 13 changes and the angle at which the display color of the region 17 changes to approximately match. Therefore, a more reliable true-false judgment can be made.

An example of such a visual effect will be described with reference to FIGS. 37 and 38.

Figure 37:
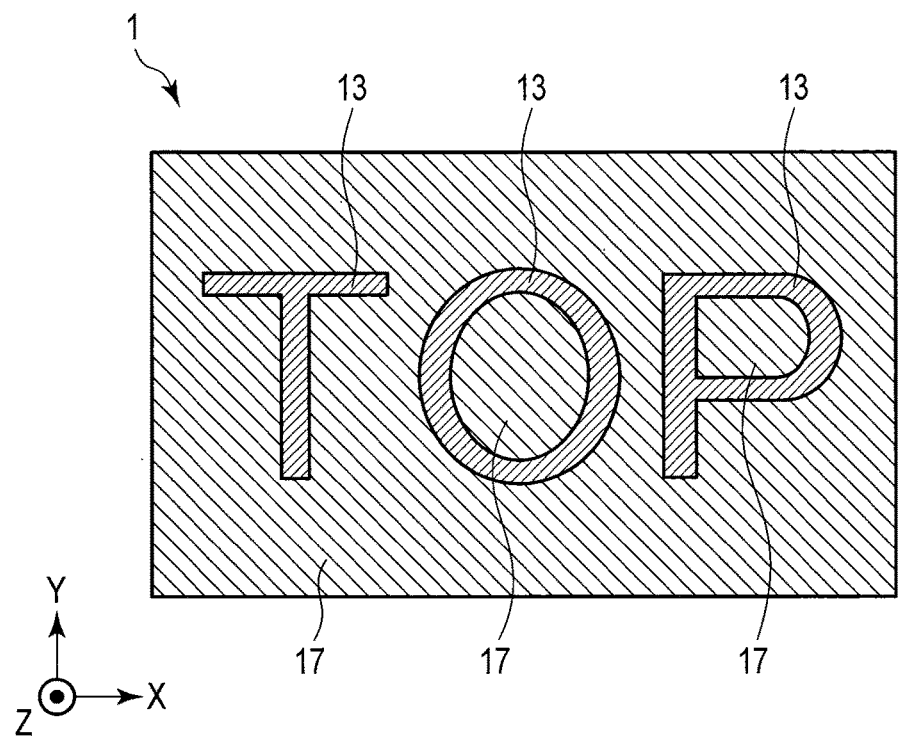
FIG. 37 is a plan view schematically showing another example of the image displayed by the display according to the third embodiment of the present invention when an observer observes it from the normal direction.

FIG. 37 is a plan view schematically showing another example of the image displayed by the display according to the third embodiment of the present invention when an observer observes it from the normal direction. FIG. 38 is a perspective view schematically showing an example of the image displayed by the display shown in FIG. 37 when an observer observes it from an oblique direction.

Figure 38:
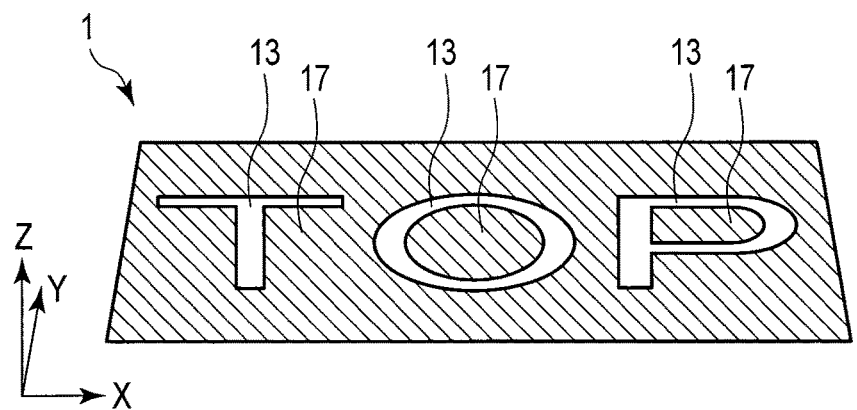
FIG. 38 is a perspective view schematically showing an example of the image displayed by the display shown in FIG. 37 when an observer observes it from an oblique direction.

The display 1 shown in FIGS. 37 and 38 is the same as the display 1 described with reference to FIGS. 1 and 2 except that the following configuration is adopted. That is, the display 1 does not contain the region 18, and the region 17 is provided with the print layer 14 described with reference to FIGS. 32 to 34. The print layer 14 is formed of functional ink whose color changes in accordance with the observation direction.

When the display 1 is observed from the normal direction, the regions 13 and 17 typically display, as shown in FIG. 37, different colors. Then, if the observation direction is sufficiently inclined, as shown in FIG. 38, both of the regions 13 and 17 change the display colors.

The print layer 14 may be arranged to face opposite a portion of the relief structure RS1. This will be described with reference to FIGS. 39 to 41.

Figure 39:
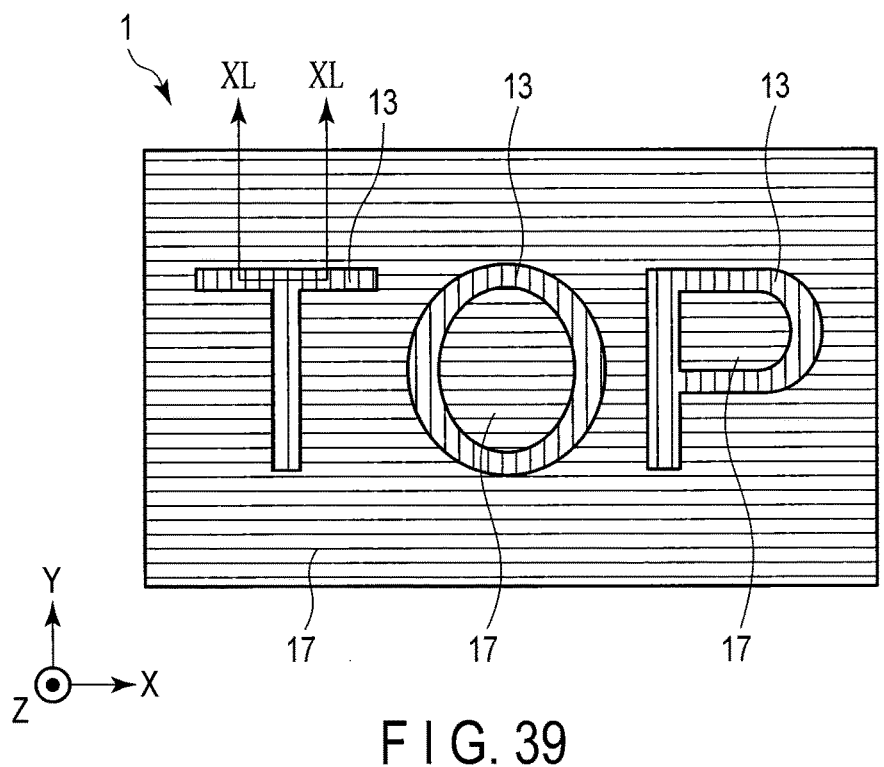
FIG. 39 is a plan view schematically showing a modification of the display shown in FIG. 33.
Figure 40:
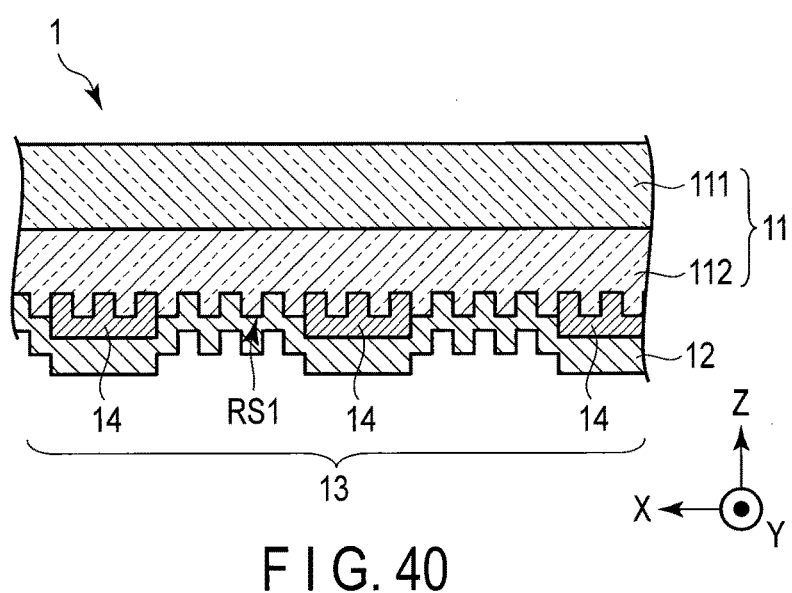
FIG. 40 is a sectional view taken along an XXXIII-XXXIII line of the display shown in FIG. 39.

FIG. 39 is a plan view schematically showing a modification of the display shown in FIG. 33. FIG. 40 is a sectional view taken along an XXXIII-XXXIII line of the display shown in FIG. 39. FIG. 41 is a perspective view schematically showing an example of the image displayed by the display shown in FIGS. 39 and 40 when an observer observes it from the oblique direction.

The display 1 shown in FIGS. 39 and 40 is the same as the display 1 described with reference to FIG. 33 except that the following configuration is adopted. That is, the display 1 does not contain the region 18. The relief structure RS1 is provided not only in the region 13, but also in the region 17. Then, the print layer 14 is provided not only in the region 17, but also in the region 13.

The relief structure RS1 provided in the region 13 and the relief structure RS1 provided in the region 17 have, for example, the same structure. Different relief structures RS1 may be provided on the surface of the relief structure formation layer 112. In such a case, the boundary of such relief structures RS1 may match the boundary of the regions 13 and 17 or may be different from the boundary of the regions 13 and 17. It is assumed here that, as an example, the same relief structure RS1 is provided in the regions 13 and 17.

The print layer 14 is provided in a stripe shape. A portion of the print layer 14 positioned in the region 13 is formed of a plurality of strip portions each extending in the Y direction and arranged in the X direction. A portion of the print layer 14 positioned in the region 17 is formed of a plurality of strip portions each extending in the X direction and arranged in the Y direction. In each of the regions 13 and 17, the strip portions are arranged at a density of, for example, 3 to 10 strip portions per millimeter. The density of the strip portions is the same in the regions 13 and 17.

As described above, the strip portions are arranged at a density of 3 to 10 strip portions per millimeter in the regions 13 and, 17. Thus, when observed with the naked eye, it is impossible or difficult to discriminate each strip portion from other strip portions. Further, as described above, the relief structure RS1 has the same structure in the regions 13 and 17, and the density of strip portion is the same in both regions. Thus, when the display 1 is observed from the normal direction, as shown in FIG. 39, it is impossible or difficult to discriminate the regions 13 and 17 from each other.

When the observation direction is inclined in a plane perpendicular to the X direction or the Y direction, the apparent density of the strip portions increases in one of the regions 13 and 17. Thus, a portion of the print layer 14 positioned in the region 13 and a portion of the print layer 14 positioned in the region 17 affect the display differently. For example, when the observation direction is inclined in a plane perpendicular to the X direction as shown in FIG. 41, the region 17 is seen darker than the region 13. Further, as described above, if the observation direction is inclined, the hue of the color displayed by the relief structure RS1 also changes. Therefore, if the observation direction is inclined in, for example, a plane perpendicular to the X direction, a latent image formed by the regions 13 and 17 is visualized by being accompanied by the change in hue.

Therefore, if the configuration described with reference to FIGS. 39 to 41 is adopted, a more complex visual effect can be achieved.

In the example described with reference to FIGS. 39 to 41, the print layer 14 is formed of two portions in which the length directions of strip portions are different and the relief structure RS1 is provided to face these portions. The relief structure RS1 may be provided to face only one of these portions or face a portion of one portion and at least a portion of the other portion.

Alternatively, the relief structure S1 may not face the print layer 14. For example, the relief structure RS1 and the print layer 14 may be arranged so that the region where the relief structure RS1 is provided and the region where the print layer 14 is provided are adjacent to each other when observed from the normal direction. When the observation direction is inclined, the display 1 adopting the above structure causes the change in hue in the region where the relief structure RS1 is provided and visualizes a latent image in the region where the print layer 14 is provided.

Fourth Embodiment

Next, the fourth embodiment of the present invention will be described.

A display according to the fourth embodiment is the same as the display 1 according to the first or second embodiment except that a structure described below is adopted in a region 13. That is, in the present embodiment, a reflection surface 22 has a shape extending in one direction.

FIG. 42 is a perspective view schematically showing an example of the structure that can be adopted for a display according to the fourth embodiment of the present invention.

In a relief structure RS1 shown in FIG. 42, the reflection surfaces 22 have shapes extending in the X direction and are arranged in the Y direction. The center-to-center distances of the reflection surfaces 22 adjacent in the width direction are irregular and the widths of the reflection surfaces 22 are also irregular. The center-to-center distances of the reflection surfaces 22 adjacent in the width direction may be regular. Alternatively, the widths of the reflection surfaces 22 may be regular.

When observed from a direction perpendicular to the X direction, the relief structure RS1 displays a mixed color. Then, observed from a direction perpendicular to the Y direction, the relief structure RS1 displays an achromatic color, for example, silver gray.

Thus, if the relief structure RS1 shown in FIG. 42 is observed from an oblique direction while rotating the relief structure RS1 around the normal of a reflection surface 21, the display color changes between chromatic colors and achromatic colors. Then, different from a general diffraction grating, if the relief structure RS1 shown in FIG. 42 is observed from a direction perpendicular to an axis parallel to the length direction of the reflection surface 22 while swinging the relief structure RS1 around the axis, the display color does not change significantly.

Such a visual effect cannot be achieved by general printed matter, nor can be achieved by a diffraction grating or hologram, nor can be achieved by a combination of a light-scattering structure and a pigmented layer. That is, the relief structure RS1 provides an extremely special visual effect.

The relief structure RS1 shown in FIG. 42 scatters light only in directions perpendicular to the X direction. Thus, compared with a relief structure that scatters light in all directions, the relief structure RS1 can make a bright display.

Moreover, as compared with a relief structure in which the reflection surface 22 is arranged two-dimensionally, the relief structure RS1 has a simple structure. Thus, the relief structure RS1 shown in FIG. 42 is easy to design and produce.

The relief structure RS1 shown in FIG. 42 can be modified in various ways.

FIG. 43 is a plan view schematically showing an example of a modification of the relief structure shown in FIG. 42. FIG. 44 is a plan view schematically showing another example of the modification of the relief structure shown in FIG. 42.

In the relief structures RS1 shown in FIGS. 43 and 44, the reflection surfaces 22 have shapes extending in the X direction and are arranged in the X and Y directions. The center-to-center distances of the reflection surfaces 22 adjacent in the width direction are irregular and the widths of the reflection surfaces 22 are also irregular. The distances between the reflection surfaces 22 adjacent in the length direction are irregular and the lengths of the reflection surfaces 22 are also irregular.

The relief structure RS1 described above can scatter light also in a direction perpendicular to the Y direction, though not so intensive as in a direction perpendicular to the X direction. Therefore, if the ratio of the length to the width of the reflection surface 22 is 10 or less, the relief structure RS1 may also display a mixed color when observed from a direction perpendicular to the Y direction.

If the ratio of the length to the width of the reflection surface 22 is small, the relief structure RS1 may display the same mixed color when observed from a direction perpendicular to the Y direction and when observed from a direction perpendicular to the X direction. When the ratio is, for example, 10 or more, an observer can perceive the difference between a mixed color displayed by the relief structure RS1 when observed from a direction perpendicular to the X direction and a mixed color displayed by the relief structure RS1 when observed from a direction perpendicular to the Y direction.

In the present embodiment, the reflection surface 22 can have various shapes. For example, the reflection surface 22 may be square as shown in FIG. 43 or rounded as shown in FIG. 44. An intermediate portion of the contour of the reflection surface 22 that is sandwiched between two ends may be linear as shown in FIGS. 43 and 44 or curved. When the contour of the reflection surface 22 is curved in the intermediate portion, the relief structure RS1 can scatter light also in a direction perpendicular to the Y direction.

The length direction of the reflection surface 22 may be direction intersecting the X direction. For example, the length direction of the reflection surface 22 may be parallel to the Y direction.

Figure 45:
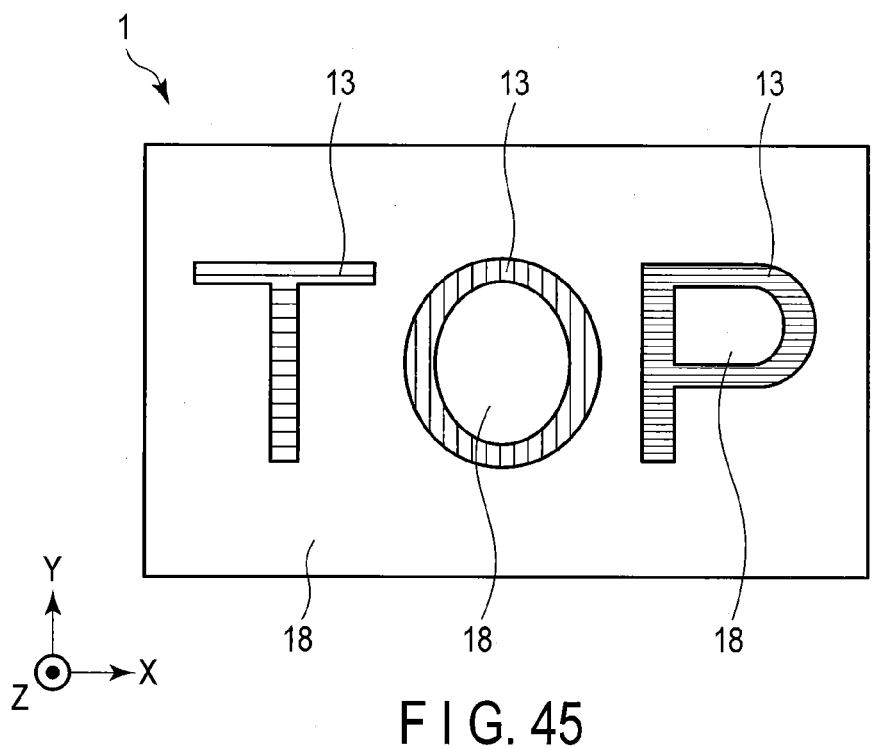
FIG. 45 is a plan view schematically showing an example of the display including the relief structure shown in FIG. 42.
Figure 46:
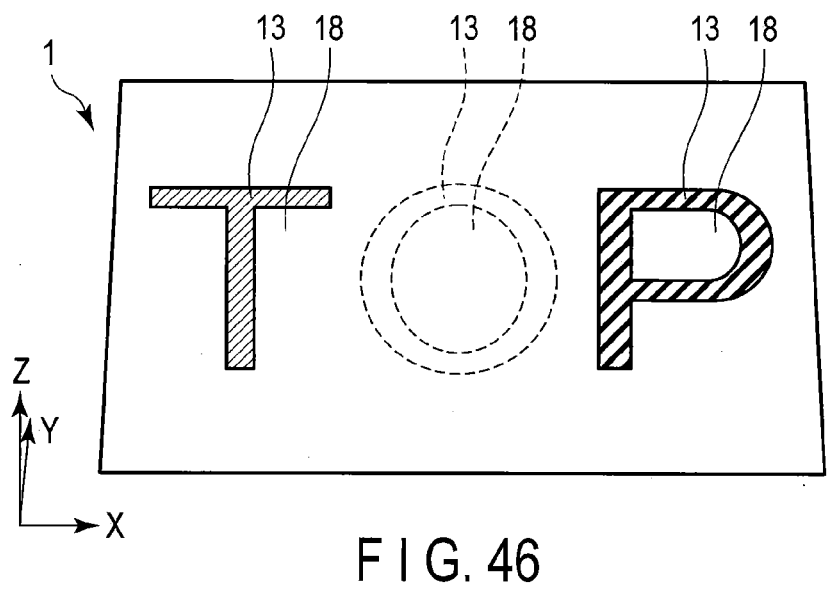
FIG. 46 is a perspective view schematically showing an example of the image displayed by the display shown in FIG. 45.

FIG. 45 is a plan view schematically showing an example of the display including the relief structure shown in FIG. 42. FIG. 46 is a perspective view schematically showing an example of the image displayed by the display shown in FIG. 45. FIG. 47 is a perspective view schematically showing another example of the image displayed by the display shown in FIG. 45.

The display 1 shown in FIG. 45 is the same as the display 1 described with reference to FIGS. 1 and 2 except that the following configuration is adopted. That is, the display 1 does not contain a region 17, and the relief structure RS1 provided in the region 13 has the structure described with reference to FIG. 42.

In the region 13 of the letter "T", the reflection surfaces 22 have the length directions parallel to the X direction and are arranged in the Y direction. Here, as an example, the average center-to-center distance of the reflection surfaces 22 is about 1 μm and the difference between heights of the reflection surfaces 21 and 22 is about 0.3 μm in the region 13.

In the region 13 of the letter "O", the reflection surfaces 22 have the length directions parallel to the Y direction and are arranged in the X direction. Here, as an example, the average center-to-center distance of the reflection surfaces 22 is about 1 μm and the difference between heights of the reflection surfaces 21 and 22 is about 0.25 μm in the region 13.

In the region 13 of the letter "P", the reflection surfaces 22 have the length directions parallel to the X direction and are arranged in the Y direction. Here, as an example, the average center-to-center distance of the reflection surfaces 22 is about 1 μm and the difference between heights of the reflection surfaces 21 and 22 is about 0.2 μm in the region 13.

When observed from an oblique direction perpendicular to the X direction as shown in FIG. 46, the display 1 displays yellow at the region 13 of the letter "T", an achromatic color at the region 13 of the letter "O", and purple at the region 13 of the letter "P". In this case, when the angle of incidence of illumination light is increased, the color displayed at the region 13 of the letter "T" and the region 13 of the letter "P" by the display 1 changes to blue-green and orange, respectively.

When observed from an oblique direction perpendicular to the Y direction as shown in FIG. 47, the display 1 displays an achromatic color at the region 13 of the letter "T", blue at the region 13 of the letter "O", and an achromatic color at the region 13 of the letter "P". In this case, when the angle of incidence of illumination light is increased, the color displayed at the region 13 of the letter "O" by the display 1 changes to purple.

As described above, the relief structure RS1 described with reference to FIGS. 42 to 44 can provide complex visual effects.

Techniques described in the first to fourth embodiments can mutually be combined. For example, the display 1 may contain two or more structures described in the first to fourth embodiments. The display 1 according to the first, third, and fourth embodiments may contain a plurality of pixels PX. In such a case, the structure described in the second embodiment may be adopted for these pixels. The display according to the first, second, and fourth embodiments may further contain the print layer 14 described in the third embodiment.

The display 1 described above can be used as a forgery-prevention label when supported by, for example, printed matter. As described above, the display 1 provides a special visual effect. The display 1 is difficult to forge. Therefore, it is difficult to forge or imitate a labeled article including an article and the display 1 supported thereby.

FIG. 48 is a plan view schematically showing an example of a labeled article. FIG. 49 is a sectional view taken along an IL-IL line of the labeled article shown in FIG. 48.

FIGS. 48 and 49 depict printed matter 100 as an example of the labeled article. The printed matter 100 is an integrated circuit (IC) card and contains a substrate 50. The substrate 50 is made of, for example, plastics. The substrate 50 has a recess provided on one main surface, and an IC chip 30 is embedded in the recess. Electrodes are provided on the surface of the IC chip 30, and information is written into the IC or information recorded in the IC is read via these electrodes. A print layer 40 is formed on the substrate 50. The above display 1 is fixed via, for example, an sticky layer to the surface of the substrate 50 on which the print layer 40 is formed. The display 1 is prepared, for example, as a self-adhesive sticker or transfer foil and fixed to the substrate 50 by being pasted to the print layer 40.

The printed matter 100 includes the display 1. Therefore, it is difficult to forge or imitate the printed matter 100. Moreover, the printed matter 100 includes, in addition to the display 1, the IC chip 30 and the print layer 40 and therefore, forgery-prevention measures using the IC chip 30 or the print layer 40 can further be adopted.

Although FIGS. 48 and 49 illustrate an IC card as printed matter including the display 1, the printed matter including the display 1 is not limited to the above example. For example, printed matter including the display 1 may be a different card such as a magnetic card, wireless card, and identification (ID) card. Alternatively, printed matter including the display 1 may be securities such as vouchers and checks. Alternatively, printed matter including the display 1 may be a tag to be attached to an article whose authenticity as an authentic article should be verified. Alternatively, printed matter including the display 1 may be a package or a portion thereof that accommodates an article whose authenticity as an authentic article should be verified.

Although the display 1 is pasted to the substrate 50 in the printed matter 100 shown in FIGS. 48 and 49, the substrate can be caused to support the display 1 by other methods. For example, when paper is used as the substrate, it is possible that the paper is made to embed the display 1 and the paper is opened at the position corresponding to the display 1. Alternatively, when a light-transmitting material is used as the substrate, the display may be embedded in the material or the display 1 may be fixed to the back side of the substrate, that is, to the surface on the opposite side of the display surface.

A labeled article may not be printed matter. That is, an article that does not contain a print layer may be caused to support the display 1. For example, an article of quality, for example, an art object may be caused to support the display 1.

The display 1 may be used for other purposes than forgery prevention. For example, the display 1 may be used as a toy, learning material, or ornament.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display comprising:
one or more first relief structures, wherein
each of the one or more first relief structures consists of a smooth first reflection surface and a plurality of protrusions or recesses,
each top surface of the protrusions or each bottom of the recesses is a smooth second reflection surface parallel to the first reflection surface, each of the one or more first relief structures is configured to display a mixed color as a structural color by mixing a plurality of wavelength components of visible light wavelengths, each of the second reflection surfaces has a height or depth relative to the first reflection surface in a range of 0.1 to 0.5 μm, and in each of the one or more first relief structures,
the second reflection surfaces all have the same shape and dimensions as each other, and are arranged at a regular center-to-center distance along a first direction and at a regular center-to-center distance along a second direction substantially perpendicular to the first direction, each of the second reflection surfaces has a length and a width in a range of 5 to 10 μm, and a ratio S1/S of an area S1 of an orthogonal projection of the first reflection surface on a plane parallel to the first reflection surface to an area S of an orthogonal projection of the first relief structure on the plane is in a range of 20 to 80%.

2. The display according to claim 1, wherein in at least one of the one or more first relief structures, the second reflection surfaces are arranged regularly at average intervals in a range of 5 to 50 μm, and a ratio S2/S of an area S2 of an orthogonal projection of the second reflection surfaces on a plane parallel to the first reflection surface to an area S of an orthogonal projection of the first relief structure on the plane is in a range of 20 to 80%.

3. The display according to claim 1, wherein a number of the one or more first relief structures is two or more, one of the first relief structures and another of the first relief structures are configured to display different mixed colors, the second reflection surfaces have an equal height or depth relative to the first reflection surface in each of the first relief structures displaying the different mixed colors, and one of the first relief structures displaying the different mixed colors and another of the first relief structures displaying the different mixed colors are different from each other in the heights or depths of the second reflection surfaces relative to the first reflection surface.

4. The display according to claim 1, further including a print layer.

5. The display according to claim 1, further including one or more second relief structures, wherein each of the one or more second relief structures constitutes one of a diffraction grating, a hologram, a light-absorbing structure that displays a color between dark gray and black when illuminated with white light, and a light-scattering structure that emits white light as scattered light when illuminated with white light.

6. The display according to claim 1, including a plurality of pixels arranged two-dimensionally, wherein each of the first relief structures constitutes a portion or a whole of one of the pixels.

7. The display according to claim 1, comprising:
a relief structure formation layer; and
a reflection layer at least partially covering one main surface of the relief structure formation layer, the first relief structures being provided at an interface between the relief structure formation layer and the reflection layer or on a surface of the reflection layer.

8. A labeled article comprising:
the display according to claim 1; and an article supporting the display.

9. The display according to claim 1, wherein the ratio S1/S is in a range of 40 to 60%.

10. The display according to claim 1, wherein in each of the one or more first relief structures,
the width of each the second reflection surfaces is substantially the same as the length of each of the second reflection surfaces.

11. The display according to claim 2, wherein in at least one of the one or more first relief structures, the second reflection surfaces are arranged regularly and have an equal height or depth relative to the first reflection surface.

12. The display according to claim 4, wherein the print layer and at least one of the one or more first relief structures display a latent image when observed in a normal direction and display a visible image when observed in an oblique direction.

13. The display according to claim 6, wherein the plurality of pixels include two or more pixels having an equal area ratio and two or more pixels having different area ratios, the area ratio being a ratio of an area of the first relief structure to an area of the pixel, and
the two or more pixels having an equal ratio are equal to each other in heights or depths of the second reflection surfaces relative to the first reflection surface, and the two or more pixels having different area ratios are different from each other in heights or depths of the second reflection surfaces relative to the first reflection surface.

14. The display according to claim 13, wherein in the two or more pixels having different area ratios, the heights or depths of the second reflection surfaces relative to the first reflection surface are greater in the pixel having the larger area ratio than in the pixel having the smaller area ratio.

15. The display according to claim 13, wherein three or more of the pixels are arranged in an order of the ratio.

* * * * *

UNITED STATES PATENT AND TRADEMARK OFFICE
CERTIFICATE OF CORRECTION

PATENT NO. : 9,855,786 B2
APPLICATION NO. : 13/485284
DATED : January 2, 2018
INVENTOR(S) : Akira Nagano et al.

It is certified that error appears in the above-identified patent and that said Letters Patent is hereby corrected as shown below:

In the Claims

Column 34, Line 19:
In Claim 10, delete "each the" and insert -- each of the --, therefore.

Signed and Sealed this
Thirty-first Day of July, 2018

Andrei Iancu
*Director of the United States Patent and Trademark Office*